US009832693B2

(12) United States Patent
Noh et al.

(10) Patent No.: US 9,832,693 B2
(45) Date of Patent: Nov. 28, 2017

(54) METHOD AND APPARATUS FOR CARRIER AGGREGATION

(71) Applicant: KT CORPORATION, Gyeonggi-do (KR)

(72) Inventors: Minseok Noh, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 125 days.

(21) Appl. No.: 14/897,230

(22) PCT Filed: Jul. 23, 2014

(86) PCT No.: PCT/KR2014/006701
§ 371 (c)(1),
(2) Date: Dec. 9, 2015

(87) PCT Pub. No.: WO2015/012591
PCT Pub. Date: Jan. 29, 2015

(65) Prior Publication Data
US 2016/0128054 A1    May 5, 2016

(30) Foreign Application Priority Data

Jul. 25, 2013  (KR) .................. 10-2013-0088234
Oct. 21, 2013  (KR) .................. 10-2013-0125599
(Continued)

(51) Int. Cl.
*H04L 5/14*    (2006.01)
*H04W 36/04*   (2009.01)
(Continued)

(52) U.S. Cl.
CPC ............. *H04W 36/04* (2013.01); *H04L 5/14* (2013.01); *H04W 36/0055* (2013.01); *H04W 56/0015* (2013.01); *H04W 84/045* (2013.01)

(58) Field of Classification Search
None
See application file for complete search history.

(56) References Cited

U.S. PATENT DOCUMENTS 8,462,688 B1    6/2013  Dinan
8,526,310 B2    9/2013  Dinan
(Continued)

FOREIGN PATENT DOCUMENTS

KR    10-2008-0081699 A    9/2008
KR    10-2010-0050575 A    5/2010
KR    10-2012-0085833 A    8/2012

*Primary Examiner* — Chi H Pham
*Assistant Examiner* — Soon-Dong D Hyun
(74) *Attorney, Agent, or Firm* — IP Legal Services, LLC

(57) ABSTRACT

The present disclosure relates to a method and an apparatus for controlling carrier aggregation. In the method, a terminal performs carrier aggregation from a first base station so that a Pcell, which is one carrier from among carriers controlled by the first base station, is used for setting another carrier to be an Scell. The terminal performs carrier aggregation from a second base station so that one carrier having the function of the Pcell from among carriers controlled by the second base station, is used for setting another carrier to be an Scell. The terminal transceiver a downlink channel and an uplink channels with the first base station and the second base station, according to settings of the Pcell and the Scell of each of the first base station and the second base station.

7 Claims, 26 Drawing Sheets

(30) Foreign Application Priority Data

Jan. 16, 2014 (KR) ........................ 10-2014-0005630
Feb. 10, 2014 (KR) ........................ 10-2014-0015075

(51) Int. Cl.
*H04W 56/00* (2009.01)
*H04W 72/04* (2009.01)
*H04W 36/00* (2009.01)
*H04W 84/04* (2009.01)

(56) References Cited

U.S. PATENT DOCUMENTS

| | | |
|---|---|---|
| 8,526,389 B2 | 9/2013 | Dinan |
| 8,531,966 B1 | 9/2013 | Dinan |
| 8,537,739 B1 | 9/2013 | Dinan |
| 8,542,654 B1 | 9/2013 | Dinan |
| 8,547,929 B1 | 10/2013 | Dinan |
| 8,553,558 B1 | 10/2013 | Dinan |
| 8,553,655 B1 | 10/2013 | Dinan |
| 8,559,405 B2 | 10/2013 | Dinan |
| 8,565,142 B1 | 10/2013 | Dinan |
| 8,588,169 B2 | 11/2013 | Dinan |
| 8,599,785 B1 | 12/2013 | Dinan |
| 8,619,727 B1 | 12/2013 | Dinan |
| 8,625,524 B2 | 1/2014 | Dinan |
| 8,804,668 B2 | 8/2014 | Dinan |
| 8,897,248 B2 | 11/2014 | Dinan |
| 8,934,438 B2 | 1/2015 | Dinan |
| 8,958,342 B2 | 2/2015 | Dinan |
| 8,964,590 B2 | 2/2015 | Dinan |
| 8,964,593 B2 | 2/2015 | Dinan |
| 8,964,683 B2 | 2/2015 | Dinan |
| 8,964,780 B2 | 2/2015 | Dinan |
| 8,971,280 B2 | 3/2015 | Dinan |
| 8,971,298 B2 | 3/2015 | Dinan |
| 8,976,765 B2 | 3/2015 | Dinan |
| 8,982,852 B2 | 3/2015 | Dinan |
| 8,989,128 B2 | 3/2015 | Dinan |
| 8,995,381 B2 | 3/2015 | Dinan |
| 8,995,405 B2 | 3/2015 | Dinan |
| 9,084,228 B2 | 7/2015 | Dinan |
| 9,084,270 B2 | 7/2015 | Dinan |
| 9,107,206 B2 | 8/2015 | Dinan |
| 9,113,387 B2 | 8/2015 | Dinan |
| 9,161,322 B2 | 10/2015 | Dinan |
| 9,161,323 B2 | 10/2015 | Dinan |
| 9,179,420 B2 | 11/2015 | Dinan |
| 9,179,425 B2 | 11/2015 | Dinan |
| 9,179,454 B2 | 11/2015 | Dinan |
| 9,179,457 B2 | 11/2015 | Dinan |
| 9,204,406 B2 | 12/2015 | Dinan |
| 9,204,407 B2 | 12/2015 | Dinan |
| 2008/0219670 A1 | 9/2008 | Kim et al. |
| 2009/0067352 A1 | 3/2009 | Wang |
| 2011/0064007 A1 | 3/2011 | Wang |
| 2012/0257552 A1 | 10/2012 | Chen et al. |
| 2012/0263128 A1 | 10/2012 | Hu et al. |
| 2013/0039291 A1* | 2/2013 | Blankenship ........... H04L 5/001 370/329 |
| 2013/0188612 A1 | 7/2013 | Dinan |
| 2013/0188617 A1 | 7/2013 | Dinan |
| 2013/0188620 A1 | 7/2013 | Dinan |
| 2013/0250881 A1* | 9/2013 | Liao ...................... H04W 36/08 370/329 |
| 2013/0258862 A1 | 10/2013 | Dinan |
| 2013/0258956 A1 | 10/2013 | Dinan |
| 2013/0258958 A1 | 10/2013 | Dinan |
| 2013/0259008 A1 | 10/2013 | Dinan |
| 2013/0260735 A1 | 10/2013 | Dinan |
| 2013/0272229 A1 | 10/2013 | Dinan |
| 2013/0279446 A1* | 10/2013 | Lv ........................ H04L 5/001 370/329 |
| 2013/0336295 A1 | 12/2013 | Dinan |
| 2014/0105175 A1 | 4/2014 | Dinan |
| 2014/0185467 A1* | 7/2014 | Heo ...................... H04W 52/54 370/252 |
| 2014/0307638 A1* | 10/2014 | Zacharias ............ H04L 5/0053 370/329 |
| 2015/0124787 A1 | 5/2015 | Dinan |
| 2015/0131589 A1 | 5/2015 | Dinan |
| 2015/0131590 A1 | 5/2015 | Dinan |
| 2015/0139140 A1 | 5/2015 | Dinan |
| 2015/0139161 A1 | 5/2015 | Dinan |
| 2015/0139162 A1 | 5/2015 | Dinan |
| 2015/0139202 A1 | 5/2015 | Dinan |
| 2015/0181547 A1 | 6/2015 | Dinan |
| 2015/0304891 A1 | 10/2015 | Dinan |
| 2015/0319752 A1 | 11/2015 | Dinan |
| 2015/0319786 A1 | 11/2015 | Dinan |
| 2016/0050647 A1* | 2/2016 | Hwang ............... H04L 12/4641 370/329 |

* cited by examiner

——— BACKHAUL LINK WITHIN CLUSTER

—·—·— BACKHAUL LINK BETWEEN SMALL CELLS & MACRO CELL

——— BACKHAUL LINK WITHIN CLUSTER
—·—·—· BACKHAUL LINK BETWEEN SMALL CELLS & MACRO CELL

FIG.6
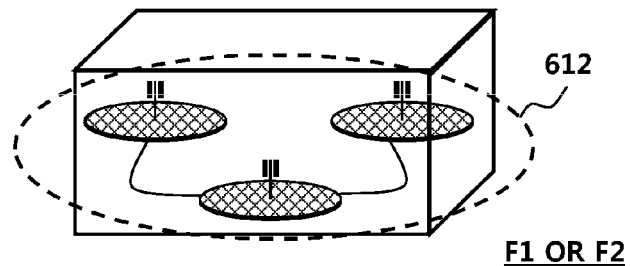

METHOD AND APPARATUS FOR CARRIER AGGREGATION

CROSS REFERENCE TO RELATED APPLICATIONS

This application is a National Stage Patent Application of PCT International Patent Application No. PCT/KR2014/006701 (filed on Jul. 23, 2014) under 35 U.S.C. §371, which claims priority to Korean Patent Application Nos. 10-2013-0088234 (filed on Jul. 25, 2013), 10-2013-0125599 (filed on Oct. 21, 2013), 10-2014-0005630 (filed on Jan. 16, 2014), and 10-2014-0015075 (filed on Feb. 10, 2014), the teachings of which are incorporated herein in their entireties by reference.

TECHNICAL FIELD

The present disclosure relates to a method and an apparatus for performing carrier aggregation and, more specifically, to a method and an apparatus for controlling and setting carrier aggregation.

BACKGROUND ART

With the progress of communication systems, a wide variety of wireless terminals has been introduced to consumers such as companies and individuals. A current mobile communication system has been affiliated with Third Generation Partnership Project (3GPP), for example, Long Term Evolution (LTE), LTE-Advanced (LTE-A), and the like. Such a mobile communication system is a high-speed and high-capacity communication system capable of transmitting and receiving various data, such as image data, wireless data, and the like, beyond providing voice-oriented services. Accordingly, it requires the development of a technology capable of transmitting a large amount of data coming close to that of a wired communication network. Meanwhile, according to the introduction of deployment such as multiple cells or small cells, there is a need for technology and a method which enable carrier aggregation to be applied in various development scenarios. Also, there is a need for technology supporting a joint operation and carrier aggregation, which allow transmission/reception to be performed in multiple base stations or in a heterogeneous network in different situations where different duplex modes (e.g., Frequency Division Duplex (FDD) and Time Division Duplex (TDD)) are set to two or more cells. Also, there is a need for technology for setting a Primary cell (Pcell) to be capable of supporting a joint operation and carrier aggregation which allow transmission/reception to be performed in multiple base stations or in a heterogeneous network in different duplex modes.

DETAILED DESCRIPTION OF THE INVENTION

Technical Problem

An aspect of the present disclosure is to enable a base station and a user equipment to designate a Pcell when supporting carrier aggregation of a macrocell and a small cell, a joint operation allowing transmission/reception to be performed in multiple base stations or in a heterogeneous network, and a dual connectivity between a macrocell and a small cell.

Also, another aspect of the present disclosure is to set a cell to allow the execution of a joint operation and carrier aggregation by a base station and a user equipment that perform transmission/reception in multiple base stations or in a heterogeneous network in different situations wheretwo or more cells are respectively set to a FDD mode and a TDD mode. When such duplex modes of two or more cells are set to be different, carrier aggregation and a joint operation are performed to aggregate carriers and perform scheduling, and thereby communication efficiency is intended to be increased.

Technical Solution

In order to solve the above-mentioned technical problem, in accordance with an aspect of the present disclosure, there is provided a method for performing carrier aggregation by a user equipment. The method includes: performing, by the user equipment, carrier aggregation in a first base station, wherein the carrier aggregation sets a secondary cell by using a primary cell, the primary cell is one of carriers controlled by the first base stataion, and the secondary cell is set with the other carriers; performing, by the user equipment, carrier aggregation in a second base station-wherein the carrier aggregation sets an secondary cell by using one carrier having a function of a primary cell among carriers controlled by the second base station, and the secondcary cell is set with the other carriers; and transmitting/receiving, by the user equipment, a downlink channel and an uplink channel to/from each of the first base station and the second base station according to the setting of the Pcell and the Scell by each of the first base station and the second base station.

The transmitting/receiving of the downlink channel and the uplink channel may include transmitting/receiving a Physical Uplink Control CHannel (PUCCH) on the carrier having the function of the Pcell.

At this time, the user equipment may be configured to access the first base station in such a manner as to prioritize the first base station over the second base station, and may set the Pcell.

In accordance with another aspect of the present disclosure, there is provided a method for performing carrier aggregation by a user equipment. The method includes: at the user equipment, performing carrier aggregation by using a primary cell, wherein the primary cell is one carrier controlled by a first base station, the carrier aggregation sets a second cell by using the other carrier controlled by the first base station and not the one carrier or by using a carrier controlled by a second base station; and transmitting, by the user equipment, an uplink control channel to the first base station and/or the second base station according to the setting of the Pcell and the Scell. The performing of the carrier aggregation may include receiving, by the user equipment, information on the first base station or the second base station that controls the carrier to be set as the Scell. At this time, the first base station may be a macrocell base station.

In accordance with another aspect of the present disclosure, there is provided a method for allowing a user equipment to perform carrier aggregation by a first base station. The method includes: transmitting, by the first base station, information, which sets another carrier as an Scell by using a Pcell which is one of carriers controlled by the first base station, to the user equipment; transmitting, by the first base station, information, which sets, as an Scell having a function of a Pcell, one of carriers controlled by a second base station distinguished from the first base station, to the user equipment; and transmitting and receiving, by the first base station and/or the second base station, a downlink channel and an uplink channel to/from the user equipment according to the setting of the Pcell and the Scell.

The Scell having the function of the Pcell may be a carrier, on which the second base station transmits/receives a PUCCH to/from the user equipment.

The user equipment may access the first base station in such a manner as to prioritize the first base station over the second base station.

In accordance with another aspect of the present disclosure, there is provided a method for allowing a user equipment to perform carrier aggregation by a first base station. The method includes: transmitting information that, by using a Pcell which is a carrier controlled by the first base station, sets a carrier, which is controlled by the first base station and is not the Pcell, as an Scell or sets a carrier, which is controlled by a second base station, as the Scell, from the first base station to the user equipment; and receiving, by the first base station and/or the second base station, an uplink control channel from the user equipment according to the setting of the Pcell and the Scell.

The transmitting of the information to the user equipment may include transmitting information on the first base station or the second base station that controls the carrier to be set as the Scell. At this time, the first base station may be a macrocell base station.

In accordance with another aspect of the present disclosure, there is provided a user equipment for performing carrier aggregation. The user equipment includes: a control unit for performing carrier aggregation in a first base station which sets another carrier as an Scell by using a Pcell which is one of carriers controlled by the first base station, and for performing carrier aggregation in a second base station which sets another carrier as an Scell by using one carrier having a function of a Pcell among carriers controlled by the second base station; a reception unit for receiving a downlink channel from each of the first base station and the second base station according to the setting of the Pcell and the Scell by each of the first base station and the second base station; and a transmission unit for transmitting an uplink channel to each of the first base station and the second base station according to the setting of the Pcell and the Scell by each of the first base station and the second base station.

The transmission unit may transmit a PUCCH on the carrier having the function of the Pcell.

The control unit may control such that the user equipment accesses the first base station in such a manner as to prioritize the first base station over the second base station and sets a Pcell.

In accordance with another aspect of the present disclosure, there is provided a user equipment for performing carrier aggregation. The user equipment includes: a control unit for performing carrier aggregation that, by using a Pcell which is a carrier controlled by a first base station, sets a carrier, which is controlled by the first base station and is not the Pcell, as an Scell or sets a carrier, which is controlled by a second base station, as the Scell; a transmission unit for transmitting an uplink control channel to the first base station and/or the second base station according to the setting of the Pcell and the Scell; and a reception unit for receiving a downlink channel from the first base station and/or the second base station according to the setting of the Pcell and the Scell.

The reception unit may receive information on the first base station or the second base station that controls the carrier to be set as the Scell. At this time, the first base station may be a macrocell base station.

In accordance with another aspect of the present disclosure, there is provided a base station for allowing a user equipment to perform carrier aggregation. The base station includes: a reception unit for receiving an uplink channel from the user equipment; a transmission unit for transmitting, to the user equipment, information which sets another carrier as an Scell by using a Pcell which is one of carriers controlled by the base station, and for transmitting, to the user equipment, information which sets, as an Scell having a function of a Pcell, one of carriers controlled by a second base station distinguished from the base station; and a control unit for controlling the transmission unit and the reception unit to transmit and receive a downlink channel and an uplink channel to/from the user equipment according to the setting of the Pcell and the Scell.

The Scell having the function of the Pcell may be a carrier, on which the second base station transmits/receives a PUCCH to/from the user equipment.

The user equipment may access the first base station in such a manner as to prioritize the first base station over the second base station.

In accordance with another aspect of the present disclosure, there is provided a base station for allowing a user equipment to perform carrier aggregation. The base station includes: a control unit for generating information that, by using a Pcell which is a carrier controlled by the base station, sets a carrier, which is controlled by the first base station and is not the Pcell, as an Scell or sets a carrier, which is controlled by the second base station, as the Scell; a transmission unit for transmitting the generated information to the user equipment; and a reception unit for receiving an uplink control channel from the user equipment according to the setting of the Pcell and the Scell.

The control unit may generate information on the first base station and the second base station that controls the carrier to be set as the Scell. At this time, the first base station may be a macrocell base station.

In order to solve the above-mentioned second technical problem, in accordance with an aspect of the present disclosure, there is provided a method for controlling carrier aggregation in different duplex modes by a base station. The method includes: performing carrier aggregation in a first duplex mode which adds another carrier as an Scell by using a Pcell which is one of carriers of the first duplex mode that a user equipment accesses; performing carrier aggregation in a second base station which adds another carrier as an Scell by using one carrier having a function of a Pcell among carriers of a second duplex mode; and transmitting/receiving a downlink channel and an uplink channel of each of the first duplex mode and the second duplex mode, according to the setting of the Pcell and the Scell in each of the first duplex mode and the second duplex mode.

At this time, the transmitting/receiving of the downlink channel and the uplink channel may include receiving uplink control information through a Physical Uplink Shared CHannel (PUSCH) on a Pcell if the carrier having the function of the relevant Pcell includes the PUSCH, or causing the uplink control information to piggyback on a PUSCH of an Scell having a lowest index, in which the PUSCH is scheduled among Scells of a first duplex mode or a second duplex mode, and receiving the uplink control information through the relevant PUSCH if the carrier having the function of the Pcell does not include the PUSCH, when a PUCCH is set to be received on the carrier having the function of the Pcell or the uplink control information is set to piggyback on the PUSCH.

At this time, the method may further include: setting, by a user equipment, a carrier of a duplex mode as a Pcell according to the relevant duplex mode of the carrier on which a synchronization channel is transmitted that the user equipment has first detected among a synchronization channel used for the carrier of the first duplex mode and a synchronization channel used for the carrier of the second duplex mode; and performing an access procedure on the Pcell.

At this time, a duplex mode, in which the access procedure is performed, may be a duplex mode which is set to have a priority.

In accordance with another aspect of the present disclosure, there is provided a method for controlling carrier aggregation in different duplex modes by a base station. The method includes: adding, as an Scell, another carrier of a first duplex mode or a carrier of a second duplex mode when one of carriers of the first duplex mode is a Pcell for a user equipment; and receiving an uplink control channel from the user equipment according to the first duplex mode of the Pcell.

At this time, the adding of the carrier as the Scell includes transmitting information including the duplex mode of the carrier to the user equipment. At this time, the first duplex mode may be Frequency Division Duplex (FDD).

In accordance with another aspect of the present disclosure, there is provided a method for setting carrier aggregation in different duplex modes by a user equipment. The method includes: setting execution of carrier aggregation in a first duplex mode which adds another carrier as a Secondary cell (Scell) by using a Primary cell (Pcell) which is one of carriers of the first duplex mode that the user equipment accesses; setting execution of carrier aggregation in a second base station which adds another carrier as an Scell by using one carrier having a function of a Pcell among carriers of a second duplex mode; and transmitting/receiving a downlink channel and an uplink channel in each of the first duplex mode and the second duplex mode, according to the setting of the Pcell and the Scell in each of the first duplex mode and the second duplex mode.

At this time, the transmitting/receiving of the downlink channel and the uplink channel may include transmitting uplink control information through a PUSCH on the Pcell if the carrier having the function of the relevant Pcell includes the relevant PUSCH, or causing the uplink control information to piggyback on a PUSCH of an Scell having a lowest index, in which the PUSCH is scheduled among Scells of the first duplex mode or the second duplex mode, and transmitting the uplink control information through the relevant PUSCH if the carrier having the function of the Pcell does not include the PUSCH, when a PUCCH is set to be transmitted on the carrier having the function of the Pcell or the uplink control information is set to piggyback on the PUSCH.

At this time, the method may further include: setting, by the user equipment and the base station, a carrier of a duplex mode as a Pcell according to the relevant duplex mode of the carrier on which a synchronization channel is transmitted which has first been detected among a synchronization channel used for the carrier of the first duplex mode and a synchronization channel used for the carrier of the second duplex mode; and performing, by the user equipment and the base station, an access procedure on the Pcell.

At this time, a duplex mode, in which the access procedure is performed, may be a duplex mode which is set to have a priority.

In accordance with another aspect of the present disclosure, there is provided a method for setting carrier aggregation in different duplex modes by a user equipment. The method includes: setting execution of carrier aggregation which adds, as a Secondary cell (Scell), another carrier of a first duplex mode or a carrier of a second duplex mode when a previously-set Primary cell (Pcell) is in the first duplex mode; and transmitting an uplink control channel to a previously-set base station according to the first duplex mode of the Pcell.

At this time, the execution of carrier aggregation may include receiving, from the base station, information including the duplex mode of the carrier. At this time, the first duplex mode may be FDD.

In accordance with another aspect of the present disclosure, there is provided a base station for controlling carrier aggregation in different duplex modes. The base station includes: a control unit for performing carrier aggregation in a first duplex mode which adds another carrier as an Scell by using a Pcell which is one of carriers of the first duplex mode that a user equipment accesses, and for performing carrier aggregation in a second base station which adds another carrier as an Scell by using one carrier having a function of a Pcell among carriers of a second duplex mode; a transmission unit for transmitting a downlink channel of each of the first duplex mode and the second duplex mode, according to the setting of the Pcell and the Scell in each of the first duplex mode and the second duplex mode; and a reception unit for receiving an uplink channel of each of the first duplex mode and the second duplex mode.

The reception unit may receive uplink control information through PUSCH on a Pcell if the carrier having the function of the relevant Pcell includes the PUSCH, or may allow the uplink control information to piggyback on a PUSCH of an Scell having a lowest index, in which the PUSCH is scheduled among Scells of a first duplex mode or a second duplex mode, and may receive the uplink control information through the relevant PUSCH if the carrier having the function of the Pcell does not include the PUSCH, when a PUCCH is set to be received on the carrier having the function of the Pcell or the uplink control information is set to piggyback on the PUSCH.

At this time, the control unit may set a carrier of a duplex mode as a Pcell according to the relevant duplex mode of the carrier on which a synchronization channel is transmitted which has first been detected among a synchronization channel used for the carrier of the first duplex mode and a synchronization channel used for the carrier of the second duplex mode, and may perform an access procedure on the Pcell.

At this time, a duplex mode, in which the access procedure is performed, may be a duplex mode which is set to have a priority.

In accordance with another aspect of the present disclosure, there is provided a base station for controlling carrier aggregation in different duplex modes. The base station includes: a transmission unit for transmitting a signal to a user equipment; a control unit for adding, as an Scell, another carrier of a first duplex mode or a carrier of a second duplex mode when one of carriers of the first duplex mode is a Pcell for the user equipment; and a reception unit for receiving an uplink control channel from the user equipment according to the first duplex mode of the Pcell.

The control unit may control the transmission unit to transmit information including the duplex mode of the carrier to the user equipment in order to add the carrier as the Scell. At this time, the first duplex mode may be FDD.

In accordance with another aspect of the present disclosure, there is provided a user equipment that is set to perform carrier aggregation in different duplex modes. The user equipment includes: a control unit for performing carrier aggregation in a first duplex mode which adds another carrier as an Scell by using a Pcell which is one of carriers of the first duplex mode that the user equipment accesses, and for performing carrier aggregation in a second base station which adds another carrier as an Scell by using one carrier having a function of a Pcell among carriers of a second duplex mode; a reception unit for receiving a downlink channel in each of the first duplex mode and the second duplex mode, according to the setting of the Pcell and the Scell in each of the first duplex mode and the second duplex mode; and a transmission unit for transmitting an uplink channel in each of the first duplex mode and the second duplex mode.

The transmission unit may transmit uplink control information through a PUSCH on the Pcell if the carrier having the function of the relevant Pcell includes the relevant PUSCH, or may allow the uplink control information to piggyback on a PUSCH of an Scell having a lowest index, in which the PUSCH is scheduled among Scells of the first duplex mode or the second duplex mode, and may transmit the uplink control information through the relevant PUSCH if the carrier having the function of the Pcell does not include the PUSCH, when a PUCCH is set to be transmitted on the carrier having the function of the Pcell or the uplink control information is set to piggyback on the PUSCH.

The control unit and the base station may set a carrier of a duplex mode as a Pcell according to the relevant duplex mode of the carrier on which a synchronization channel is transmitted which has first been detected among a synchronization channel used for the carrier of the first duplex mode and a synchronization channel used for the carrier of the second duplex mode, and may perform an access procedure on the Pcell.

At this time, a duplex mode, in which the access procedure is performed, may be a duplex mode which is set to have a priority.

In accordance with another aspect of the present disclosure, there is provided a user equipment that is set to perform carrier aggregation in different duplex modes. The user equipment includes: a control unit for performing carrier aggregation which adds, as an Scell, another carrier of a first duplex mode or a carrier of a second duplex mode when a previously-set Pcell is in the first duplex mode; and a transmission unit for transmitting an uplink control channel to a previously-set base station according to the first duplex mode of the Pcell.

The control unit may control the reception unit to receive, from the base station, information including the duplex mode of the carrier in order to perform carrier aggregation. At this time, the first duplex mode may be FDD.

Advantageous Effects

In the case of the implementation of the present disclosure, when supporting carrier aggregation and a joint operation of a macrocell and a small cell, and a dual connectivity between the macrocell and the small cell, a Pcell is designated for a base station and a user equipment, and carrier aggregation is performed, and thereby communication efficiency can be increased.

Also, when the present disclosure is implemented, a joint operation and carrier aggregation can be performed in different duplex modes by setting a Pcell in different duplexes. Communication efficiency can be increased by performing carrier aggregation of carriers having different duplex modes and performing a joint operation and carrier aggregation.

BRIEF DESCRIPTION OF THE DRAWINGS

FIG. 3 to FIG. 6 are views each illustrating a detailed scenario of small cell deployment.

MODE FOR CARRYING OUT THE DISCLOSURE

Figure 1:
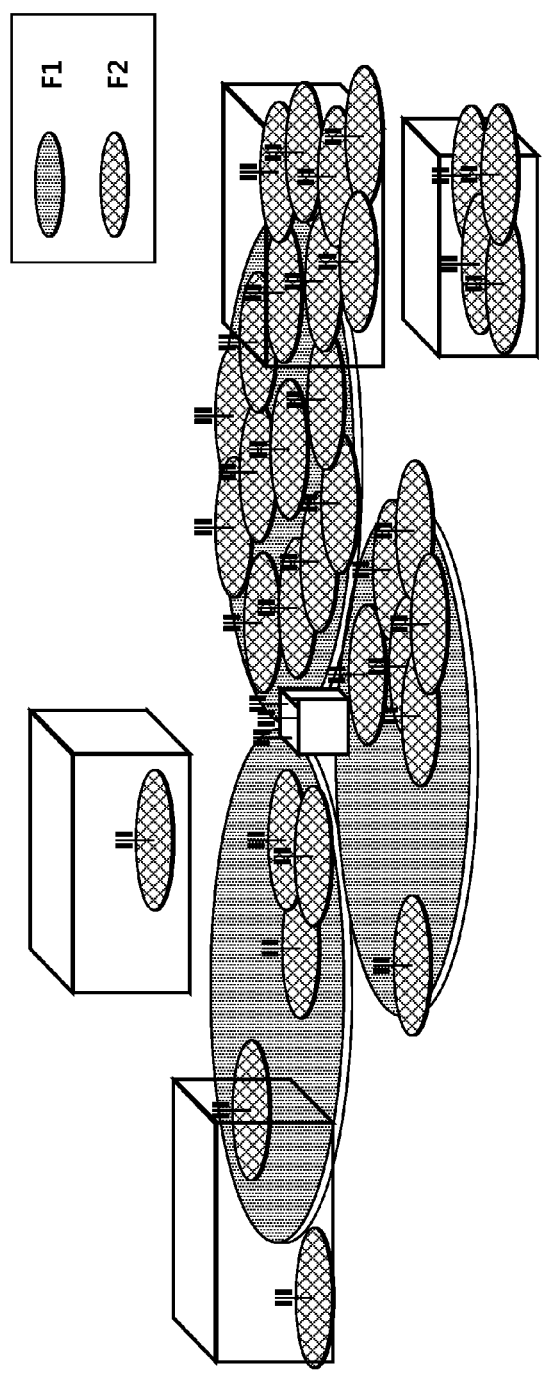
FIG. 1 is a view illustrating small cell deployment according to an embodiment of the present disclosure.

Hereinafter, embodiments of the present disclosure will be described with reference to the exemplary drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

The wireless communication system may be widely installed so as to provide various communication services, such as a voice service, packet data, and the like. The wireless communication system may include a User Equipment (UE) and a Base Station (BS or an eNB). Throughout the specifications, the user equipment may be an inclusive concept indicating a terminal utilized in wireless communication, including a UE (User Equipment) in wideband code division multiple access (WCDMA), long term evolution (LTE), high speed packet access (HSPA), and the like, and an MS (Mobile station), a UT (User Terminal), an SS (Subscriber Station), a wireless device, and the like in global systems for mobile communication (GSM).

A base station or a cell may generally refer to a station communicating with a User Equipment (UE). The base station may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

In the specification, the base station or the cell may have an inclusive concept indicating a portion of an area covered and functions performed by a BSC (Base Station Controller) in CDMA, a NodeB in WCDMA, an eNB or a sector (site) in LTE, and the like. The base station or cell may include various coverage areas, such as a megacell, a macrocell, a microcell, a picocell, a femtocell, a communication range of a relay node, an RRU, and an RU, and the like.

Each of the above mentioned various cells has a base station that controls a corresponding cell. The base station may be construed in two ways: i) the base station may be a device itself that provides a megacell, a macrocell, a microcell, a picocell, a femtocell, and a small cell in association with a wireless area, or ii) the base station may indicate a wireless area itself. In i), a base station may indicate devices that interact with one another and cooperate each other to provide a predetermined wireless area to be controlled by an identical entity or to configure the wireless area. Based on a configuration type of a wireless area, a base station may be referred to as an eNB, an RRH, an antenna, an RU, a Low Power Node (LPN), a point, a transmission/reception point, a transmission point, a reception point, and the like. A base station may be indicated as a wireless area itself that receives or transmits a signal from the perspective of a UE or a neighboring base station.

Therefore, a base station may be commonly referred to as a megacell, a macrocell, a microcell, a picocell, a femtocell, a small cell, an RRH, an antenna, an RU, an LPN, a point, an eNB, a transmission/reception point, a transmission point, and a reception point.

In the specification, the user equipment and the base station are described as two inclusive transceiving subjects to embody the technology and technical concepts described in the specifications. However, it may not be limited to a predetermined term or word. The user equipment and the base station are described as two inclusive transceiving subjects (Uplink and Downlink) to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Multiple access schemes may be unrestrictedly applied to the wireless communication system. The wireless communication system may utilize varied multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields to which the technical idea of the present disclosure is applicable.

Uplink transmission and downlink transmission may be performed based on a TDD (Time Division Duplex) scheme that performs transmission based on different times. Alternatively, uplink transmission and downlink transmission may be performed based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), PCFICH (Physical Control Format Indicator CHannel), PHICH (Physical Hybrid ARQ Indicator CHannel), PUCCH (Physical Uplink Control CHannel), and the like, and may be configured as a data channel, such as PDSCH (Physical Downlink Shared CHannel), PUSCH (Physical Uplink Shared CHannel), and the like, so as to transmit data.

In addition, control information may also be transmitted using an EPDCCH (enhanced PDCCH or extended PDCCH).

In the specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system according to embodiments refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and UEs.

A multiple transmission/reception points (or a transmission/reception communication system) may be a base station or a macrocell (hereinafter, referred to as an 'eNB') and at least one RRH that is connected to an eNB through an optical cable or an optical fiber and is wiredly controlled, and has a high transmission power or a low transmission power within a macrocell.

Hereinafter, a downlink refers to communication or a communication path from a multiple transmission/reception points to a UE, and an uplink refers to communication or a communication path from a UE to multiple transmission/reception points. In a downlink, a transmitter may be a part of multiple transmission/reception points and a receiver may be a part of a UE. In an uplink, a transmitter may be a part of a UE and a receiver may be a part of multiple transmission/reception points.

Hereinafter, an event in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received or a signal is transmitted or received through a PDCCH" includes "an EPDCCH is transmitted or received or a signal is transmitted or received through an EPDCCH".

That is, a downlink control channel used herein may indicate a PDCCH or an EPDCCH, and may indicate a meaning including both a PDCCH and an EPDCCH.

In addition, for ease of description, a PDCCH, which corresponds to an embodiment of the present disclosure, may be applied to the part described using a PDCCH.

Meanwhile, high layer signaling as used herein includes RRC signaling for transmitting RRC information including RRC parameters.

An eNB executes downlink transmission to UEs. The eNB 110 may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

The present disclosure relates to an operating method and an apparatus of a UE, which enable the UE belonging to a relevant BS to support a joint operation and carrier aggregation of FDD and TDD when a small cell and an optional cell/BS/RRH/antenna/RU support different duplex modes (i.e., FDD and TDD) in a multilayer cell structure, and a method for a BS using the relevant method and an apparatus for the same.

Also, the present disclosure relates to a method and an apparatus for designating a Pcell when each duplex mode is used in a macrocell, a small cell, and an optional cell/BS/RRH/antenna/RU regardless of a duplex mode and supports carrier aggregation of a macrocell and a small cell, a joint operation thereof, and a dual connectivity therebetween.

The present disclosure provides an operating method and an apparatus of a BS and an operating method and an apparatus of a UE, which set a Pcell when a BS considers a joint operation and carrier aggregation of FDD and TDD, which are different duplex modes, with respect to a UE.

According to an embodiment of the present disclosure, a method may be provided for setting a Pcell by a UE. The method includes: receiving Pcell indication information considering a joint operation and carrier aggregation of FDD and TDD, which are duplex modes, or receiving a signal including information on designation of a Pcell, from a BS receiving a downlink (DL) signal; and setting one Pcell in the FDD and TDD duplex modes, or one Pcell for each of the FDD and the TDD on the basis of the received signal.

Also, the present disclosure provides a method and an apparatus for designating a Pcell/Scell according to different duplex modes, which may be applied regardless of a duplex mode when carrier aggregation, a joint operation, and a dual connectivity are performed in an environment of different macrocell and small cell (or macro eNB and small cell eNB).

A small cell using a low-power node is considered as a means for coping with mobile traffic explosion. A low-power node refers to a node using lower transmission (Tx) power than that of a typical macro node.

Through Carrier Aggregation (hereinafter referred to as "CA") technology before 3rd Generation Partnership Project (3GPP) Release 11, a small cell may be built by using low-power Remote Radio Head (RRH) which is geographically-distributed antennas within a macrocell coverage.

However, in order to apply the CA technology, the macrocell and the RRH cell are built to be scheduled under the control of one BS. To this end, it is required to build an ideal backhaul between the macrocell node and the RRH.

The ideal backhaul refers to a backhaul showing very high throughput and a very short delay, such as a dedicated point-to-point connection using an optical line (optical fiber) and a Line-Of-Sight (LOS) microwave.

In contrast, a non-ideal backhaul refers to a backhaul showing relatively low throughput and a relatively long delay, such as a Digital Subscriber Line (xDSL) and a non-LOS microwave.

Through the above-described single BS-based CA technology, multiple serving cells may be aggregated and may provide a service to the UE. Specifically, the multiple serving cells may be configured for the UE in a Radio Resource Control (hereinafter referred to as "RRC")-connected state, and the macrocell and the RRH cell may be configured together as a serving cell and may provide a service to theUE, when the ideal backhaul is built between the macrocell node and the RRH.

When the single BS-based CA technology is configured, the UE may have only one RRC connection with a network.

At RRC connection establishment/re-establishment/handover, one serving cell provides Non-Access Stratum (hereinafter referred to as "NAS") mobility information (e.g., a Tracking Area Identity (TAI)), and at RRC connection re-establishment/handover, one serving cell provides a security input. Such a cell is referred to as a "Pcell." The Pcell may be changed according to only a handover procedure. According to UE capabilities, Secondary cells (Scells) and a Pcell may be configured together as a serving cell.

Hereinafter, a small cell deployment scenario will be described as a communication environment where embodiments of the present disclosure will be applied to.

FIG. 1 is a view illustrating small cell deployment according to an embodiment of the present disclosure.

Figure 2:
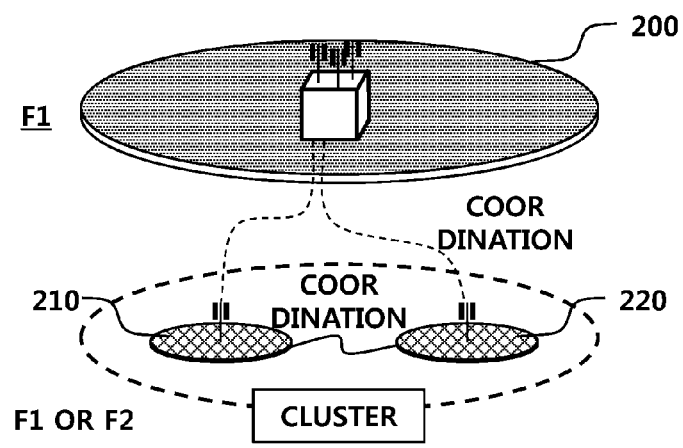
FIG. 2 is a view illustrating a small cell deployment scenario.
Figure 3:
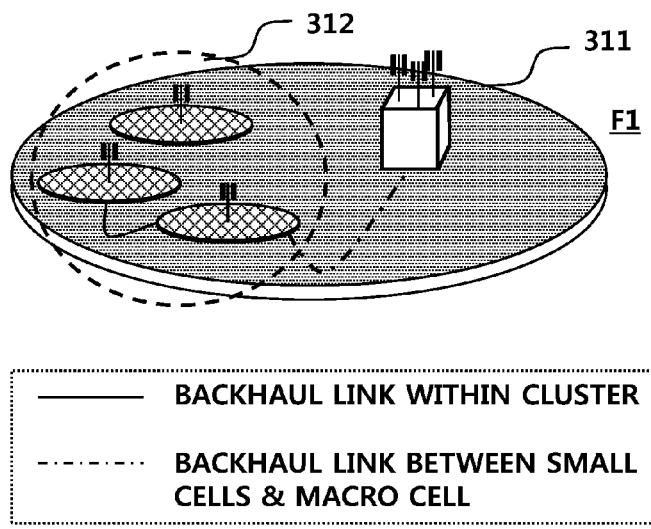

Referring to FIG. 1, a communication environment includes small cells overlaying with macrocells. In FIG. 2 and FIG. 3 below, such a communication environment is classified in more detail according to whether macro coverage exists, whether a relevant small cell is for outdoor or indoor use, whether deployment of relevant small cells is in a sparse situation or in a dense situation, and whether an identical frequency spectrum is used.

FIG. 2 is a view illustrating a small cell deployment scenario. The small cell deployment of FIG. 2 denotes a typical representative configuration of the scenario of FIG. 3. FIG. 2 illustrates the small cell deployment scenario, and the small cell deployment scenario of FIG. 2 includes scenarios #1, #2a, #2b, and #3. Reference numeral 200 indicates a macrocell, and each of reference numerals 210 and 220 indicates a small cell. In FIG. 2, an overlaid macrocell may exist or may not exist. Coordination may be performed between the macrocell 200 and the small cells 210 and 220, and coordination may also be performed between the small cells 210 and 220. Further, overlaid areas of the macrocell 200 and the small cells 210 and 220 may be tied to a cluster.

FIG. 3 to FIG. 6 illustrate scenarios of small cell deployment.

FIG. 3 illustrates a small cell deployment scenario #1. The scenario 1 is a co-channel deployment scenario of a small cell and a macrocell in the existence of an overhead macro, and the first scenario 1 is an outdoor small-cell scenario. In FIG. 3, a macrocell 311 and small cells are all outdoor cells, and reference numeral 312 indicates a small cell cluster. All users are distributed in indoor and outdoor environments.

Solid lines connecting the small cells within the small cell cluster 312 denote a backhaul link within the cluster. Dotted lines connecting the macrocell BS to the small cells within the cluster denote a backhaul link between the small cells and the macrocell.

Figure 4:
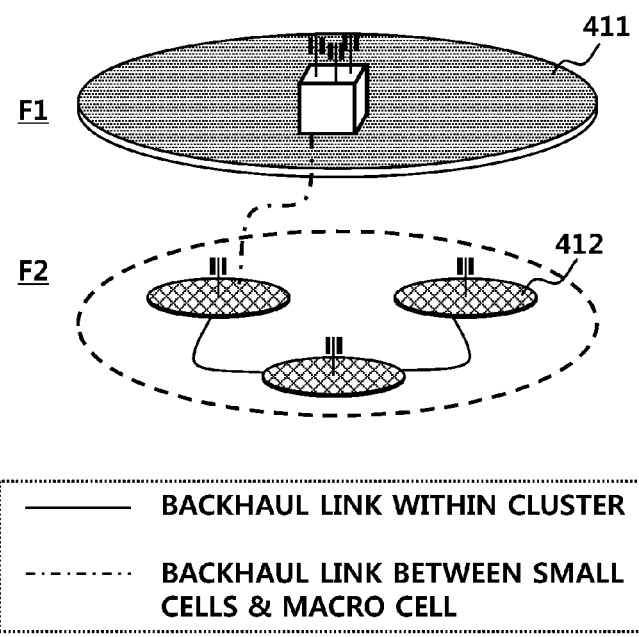

FIG. 4 illustrates a small cell deployment scenario #2a. The scenario 2a is a deployment scenario in which small cells and a macrocell use different frequency spectrums in the existence of an overlaid macrocell, and the scenario 2a is an outdoor small-cell scenario. In FIG. 4, the macrocell 411 and the small cells are all outdoor cells, and reference numeral 412 indicates a small cell cluster. All users are distributed in indoor and outdoor environments.

Solid lines connecting the small cells within the small cell cluster 412 denote a backhaul link within the cluster. Dotted lines connecting the macrocell BS to the small cells within the cluster denote a backhaul link between the small cells and the macrocell.

Figure 5:
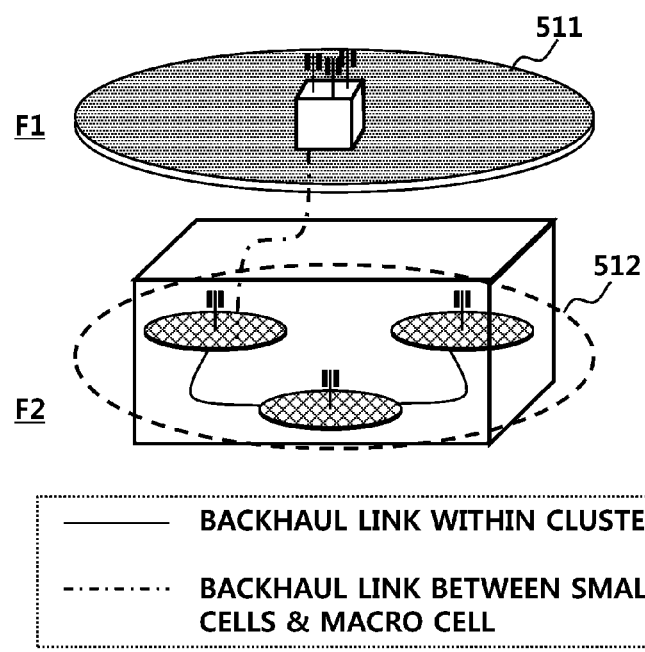

FIG. 5 illustrates a small cell deployment scenario #2b. The scenario 2b is a deployment scenario in which small cells and a macrocell use different frequency spectrums in the existence of an overlaid macrocell, and the scenario 2b is an indoor small-cell scenario. The macrocell 511 is an outdoor cell, the small cells are all indoor cells, and reference numeral 512 indicates a small cell cluster. All users are distributed in indoor and outdoor environments.

Solid lines connecting the small cells within the small cell cluster 512 signify a backhaul link within the cluster. Dotted lines connecting the macrocell BS to the small cells within the cluster signify a backhaul link between the small cells and the macrocell.

FIG. 6 illustrates a small cell deployment scenario #3. The scenario 3 is an indoor small-cell scenario in a situation where a coverage of a macrocell does not exist. Reference numeral 612 indicates a small cell cluster. Also, the small cells are all indoor cells, and all users are distributed in indoor and outdoor environments.

Solid lines connecting the small cells within the small cell cluster 612 signify a backhaul link within the cluster. Dotted lines connecting the macrocell BS to the smalls within the cluster signify a backhaul link between the small cells and the macrocell.

Frequencies F1 and F2 used in FIG. 1 and the various small cell scenarios of FIG. 2 to FIG. 6, which have been described above, may be frequencies supporting an identical duplex mode, or may have different duplex modes, respectively. For example, F1 denotes a frequency supporting an FDD mode, and F2 denotes a frequency supporting a TDD mode. Alternatively, F1 denotes a frequency supporting a TDD mode, and F2 denotes a frequency supporting an FDD mode.

Figure 7:
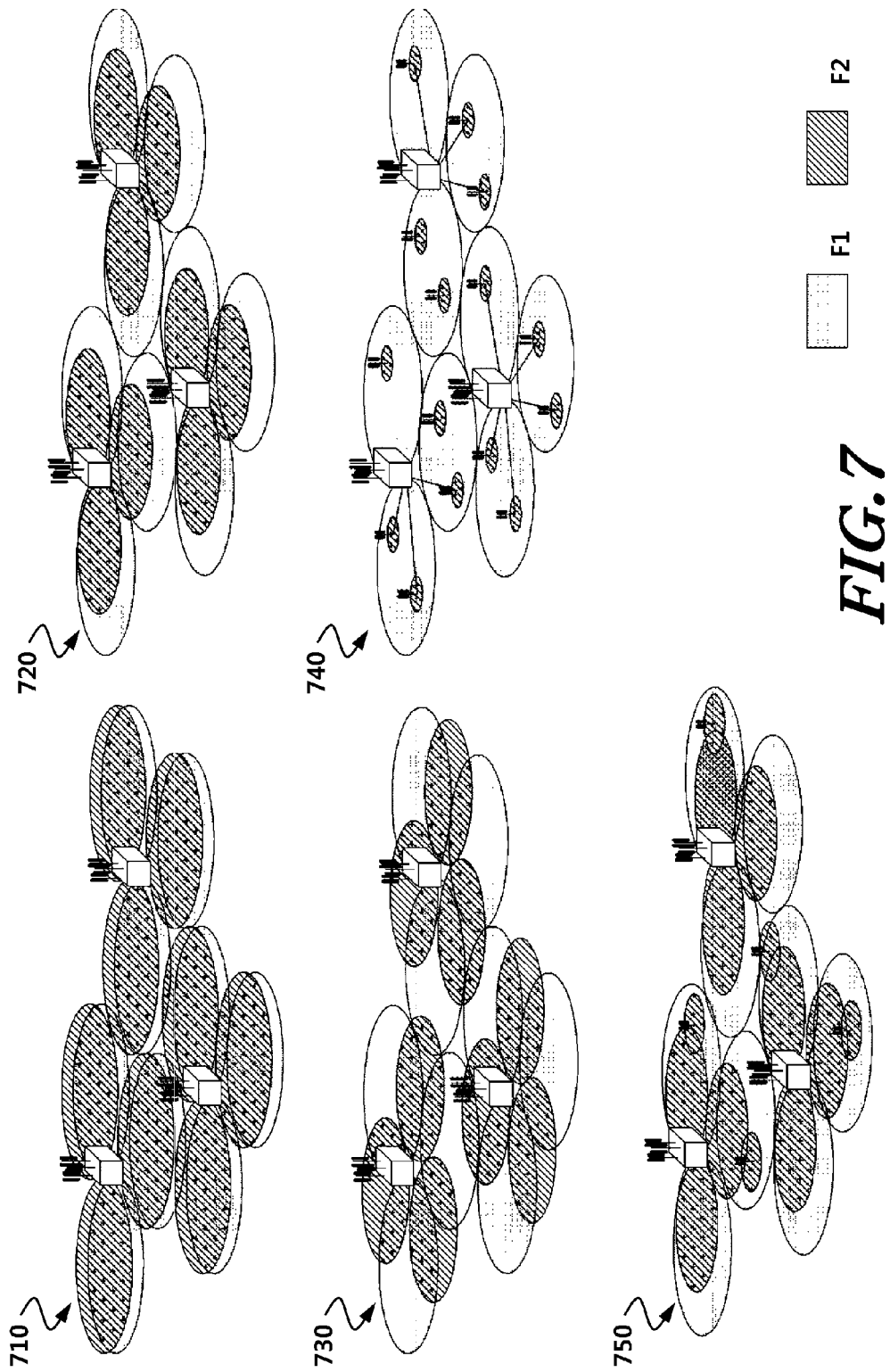
FIG. 7 is a view illustrating various scenarios of carrier aggregation.

FIG. 7 illustrates various scenarios of CA.

Referring to FIG. 7, even in a CA scenario, the frequencies F1 and F2 may be frequencies supporting an identical duplex mode or may be frequencies supporting different duplex modes.

Reference numeral 710 indicates a communication environment that F1 and F2 cells are co-located and overlaid under coverages which are nearly identical to each other. Reference numeral 710 indicates a scenario in which the two layers provide sufficient coverage and mobility and the overlaid F1 and F2 cells can be aggregated.

Reference numeral 720 indicates a scenario in which the F1 and F2 cells are co-located and overlaid but the coverage of F2 is smaller than that of F1. Reference numeral 720 indicates the scenario in which F1 has sufficient coverage, mobility support is also performed based on the F1 coverage, F2 is used to improve throughput, and the overlaid F1 and F2 cells can be aggregated.

Reference numeral 730 indicates a scenario in which the F1 and F2 cells are co-located but F2 antennas are directed to the edge of a cell in order to increase cell edge throughput. Reference numeral 730 indicates the scenario in which mobility support is performed based on the F1 coverage, and F1 has sufficient coverage but F2 temporarily has a coverage hole. In the scenario, the F1 and F2 cells in an identical eNB can be aggregated at a place where coverages of the F1 and F2 cells are overlaid.

Reference numeral 740 indicates a scenario in which F1 has macro coverage and an RRH at F2 is used to improve throughput in a hot spot area. In the scenario, mobility support is performed based on the F1 coverage and the F1 macrocell and cells of F2 RRHs can be aggregated together.

Similarly to the scenario indicated by reference numeral 720, a scenario indicated by reference numeral 750 is a scenario in which frequency-selective repeaters are deployed to extend the coverage of one carrier. In the scenario, the F1 and F2 cells in an identical eNB can be aggregated at a place where coverages of the F1 and F2 cells are overlaid.

In this specification, when a UE configures a dual connectivity, a BS will be described as a master BS or a first BS if the BS forms an RRC connection with the UE and provides a cell (e.g., a Pcell) that becomes a reference of a handover, terminates an S1-Mobility Management Entity (MME), and serves as a mobility anchor in a core network.

The master BS or the first BS may be a BS providing a macrocell. Alternatively, the master BS (or the first BS) may be a BS providing any one small cell when a dual connectivity is formed between small cells.

Meanwhile, in a dual connectivity environment, a BS, distinguished from the master BS, providing additional radio resources to the UE will be described as a secondary BS or a second BS.

Each of the first BS (or the master BS) and the second BS (or the secondary BS) may provide at least one cell to the UE, and the first and second BSs may be connected to each other through an interface therebetween.

Also, in order to help understanding, a cell associated with the first BS may be described as a macrocell, and a cell associated with the second BS may be described as a small cell. However, in a small cell cluster scenario described below, even a cell associated with the first BS may be described as a small cell.

In the present disclosure, a macrocell may signify each of cells associated with the first BS or a representative one of the cells associated with the first BS. Also, a small cell may signify each of cells associated with the secede BS or a representative one of the cells associated with the second BS. However, it is not limited thereto. For example, in a particular scenario (e.g., a small cell cluster), a small cell may be a cell associated with the first BS. In this case, a cell of the second BS may be described as another small cell or still another small cell.

Hereinafter, for convenience and ease of description, a macrocell may denote a cell associated with the master BS or the first BS, and a small cell may denote a cell associated with the secondary BS or the second BS. However, the present disclosure is not limited thereto. Accordingly, embodiments of the present disclosure may be applied even to a situation where the secondary BS or the second BS is associated with the macrocell and the master BS or the first BS is associated with the small cell.

When CA is supported, CA may be considered to be performed within a FDD mode or a TDD mode. When CA is consider to be performed in the FDD mode or the a TDD mode, component carrier (CC) may be set to be discriminated as follows.

First, a primary cell (Pcell) will be described.

When CA is configured, i) the UE has one RRC connection with a network, ii) one serving cell provides NAS mobility information during RRC connection establishment/re-establishment/handover, and iii) one serving cell provides a security input during RRC connection re-establishment/handover. Such a serving cell is referred to as a primary cell "Pcell." A carrier corresponding to a Pcell includes a Downlink Primary Component Carrier (DL PCC) in DL an Uplink Primary Component Carrier (UL PCC) in UL.

The primary cell (Pcell) may be changed only by a handover procedure. The Pcell is used to transmit a PUCCH. Also, the Pcell may not be deactivated differently from secondary cells (Scells). Also, re-establishment is triggered when the Pcell experiences a Radio Link Failure (RLF), but is not achieved when an Scell experiences an RLF. Further, NAS information is obtained from the Pcell.

Next, an secondary cell (Scell) will be described.

Depending on UE capability, Scells and a Pcell may be configured together in the form of a set of serving cells. A carrier corresponding to an Scell includes a DL Secondary Component Carrier (DL SCC) in DL a UL Secondary Component Carrier (UL SCC) in UL.

A set of serving cells, which is configured for one UE, includes one Pcell and one or more Scells. The number of serving cells depends on aggregation capability of the UE.

Scell reconfiguration, Scell addition, and Scell removal may be performed by RRC. The RRC may reconfigure, add, and remove Scells in order to use Scells together with a target Pcell during an intra-LTE handover. When new SCells are added, dedicated RRC signaling is used to transmit all pieces of required system information of SCells. In a connected mode, the UE does not need to directly obtain broadcasted system information from Scells.

When CA is supported, CA may be considered to be performed in each of a FDD mode and a TDD mode. However an aggregation operation and a joint operation have not been considered to be performed in carriers having different duplex modes such as FDD and TDD. Such an aggregation operation and joint operation in carriers having different duplex modes (e.g., FDD and TDD) are proposed in accordance with embodiments of the present disclosure. Also, a CA operation and a joint operation between a macrocell and a small cell have not been considered to be performed within a small cell considering non-ideal backhaul regardless of identical duplex mode or different duplex modes. Furthermore, the CA and the joint operation have not been considered to be performed when a dual connectivity is not supported.

Accordingly, in accordance with embodiments of the present disclosure, an operating method of a UE and an operating method of a BS may be provided for performing a joint operation and a CA operation in different duplex modes (e.g., FDD and TDD). Also, in accordance with embodiments of the present disclosure, a method may be provided for performing a CA operation and a joint operation between a macrocell and a small cell in a small cell environment considering a non-ideal backhaul. Furthermore, a method may be provided for designating a Pcell when a dual connectivity is supported.

When a BS allows a UE to set a joint operation and a CA operation of FDD and TDD which are different duplex modes, it is required to define an operating method of the UE and an operation of the BS differently from that of performing a CA operation in each of the duplex modes. Accordingly, in accordance with embodiments of the present disclosure, an operating method of a UE, a method of a BE for setting an operation of a UE, a UE, and a BS may be provided for performing a joint operation and a CA operation in different duplex modes. That is, according to embodiments of the present disclosure, a BS and an operating method thereof, and a UE and an operating method thereof may be provided for setting a Pcell when the BS considers to control the UE to perform a joint operation and a CA between different duplex modes (e.g., FDD and TDD).

Also, it is required to define an operation method of a UE and an operation method of a base station i) when a macrocell considers a non-ideal backhaul even in an identical duplex mode, ii) when small cells uses the respective duplex modes regardless of a duplex mode in a small cell environment, and iii) a CA and a joint operation with a macrocell and a small cell and a dual connectivity therebetween are supported, differently from that for performing CA in one BS. Accordingly, in accordance with embodiments of the present disclosure, an operating method of a UE, a method of a BS for setting an operation of the UE an apparatus of the UE, and an apparatus of the BS are provided.

A method may be provided for setting a Pcell by a UE according to an embodiment of the present disclosure. The method includes: receiving Pcell indication information in consideration of a joint operation and CA of a FDD and a TDD, or receiving a signal including information on designation of a Pcell, from a BS receiving a DL signal; and setting one Pcell in the FDD and TDD duplex modes, or one Pcell for each of the FDD and the TDD on the basis of the received signal.

Hereinafter, embodiments of a method for defining/designating/setting a Pcell during a joint operation and CA of TDD and FDD will be described.

First Embodiment 1: a Duplex Mode-Dependent Pcell Definition Method

The first embodiment 1 is a method for defining a Pcell depending on a duplex mode. That is, it is a method for designating one Pcell for each of an frequency division duplex (FDD) mode and a time division duplex (TDD) mode when a carrier of a FDD is set as one or more multiple CCs and when a carrier of TDD is set as one or more multiple CCs with respect to a CC configured for the UE.

This method allows transmission of DL control/data and UL control/data for each of the FDD mode and the TDD mode to follow operations of a Pcell and Scells designated for each of the relevant FDD and TDD duplex modes. This method also defines operations of a Pcell and Scells transmitting Hybrid Automatic Repeat reQuest (HARQ)-Acknowledgement/Negative Acknowledgement (ACK/NACK) and Uplink Control Information (UCI) as feedback of DL data in order to follow operations of a UE and a BS depending on a Pcell and Scells according to the respective duplex modes. In the aspect of transmitting a PUCCH in UL under the relevant CA, a PUCCH defined for each duplex mode enables UCI to be transmitted by using a method in which transmission is performed on only a Pcell. Also, when the UCI piggybacks on a PUSCH, it is possible to establish rules as to which CCs (i.e., a Pcell, or an Scell) are used to transmit the UCI. For example, when a Pcell includes a PUSCH, the UCI may be set to be transmitted through the PUSCH of the Pcell. When the Pcell does not include a PUSCH but Scells include a PUSCH, the UCI may be set to be transmitted through a PUSCH of an Scell having the lowest index among the relevant Scells. Alternatively, when an aperiodic Channel State Information (CSI) request is designated by the BS, UCI may be set to be transmitted through a PUSCH of the relevant Pcell or Scell indicated by a UL grant indicating the relevant aperiodic CSI request.

Also, when a joint operation and a CA operation of a TDD and a FDD are performed, in an aspect of the transmission of a PUSCH, the transmission of a PDSCH, and the transmission of a PUSCH under the CA, the PDSCH and the PUSCH may be set to be capable of being transmitted according to an operating method of the UE and an operating method of the BS under controlling a Pcell defined in each duplex mode.

Finally, the first embodiment 1 may be considered to be a method for minimizing the effect on operations of legacy UEs, when comparing a first case where an operation of the UE and a setting by the BS depending on the joint operation and the CA operation of the TDD and FDD support a FDD-duplex-mode-only under CA with a second case where the operation of the UE and the setting by the BS depending on the joint operation and CA of the TDD and FDD support a TDD-duplex-mode-only under CA, wherein the operation of the UE and the setting by the BS is performed by using a method applied to a case of the CA defined for each of the FDD and TDD duplex modes. Specifically, since there exists an operation as a Pcell according to each of the FDD and TDD modes, an operation of the UE and an operation of the BS may be performed independently between the duplex modes, according to operations of a Pcell and an Scell defined in each duplex mode. When a Pcell is defined/designated/set according to the relevant setting, the first embodiment 1 enables the joint operation and CA of the TDD and FDD to be performed while minimizing the effect on operations of legacy UEs.

However, in the case of the relevant method, when an access procedure is performed, consideration may be given to a scheme which allows a duplex mode, in which access is first performed, to be first set and allows the access procedure to be performed according to the setting of the relevant Pcell. Examples of the access procedure may include a cell search procedure, a random access procedure, a handover procedure, and the like. This scheme allows the access procedure to follow the relevant Pcell according to whether a synchronization channel used for an FDD carrier is first detected, or whether a synchronization channel used for a TDD carrier is first detected, when a cell search is performed by the UE.

There is another method which sets a priority to be assigned to a particular duplex mode, for example, assigns a priority to an FDD carrier when an LTE network is conventionally deployed by using the FDD carrier and sufficient coverage and mobility support are provided by the relevant FDD carrier, and which allows the access procedure to be performed. Alternatively, another method assigns a priority to a TDD carrier and allows the access procedure to be performed when, differently from the above-described case, an LTE network is conventionally deployed by using the TDD carrier and sufficient coverage and mobility support are provided by the relevant TDD carrier. This method can solve ambiguity between the UE and the BS which may occur in the access procedure according to the setting of a Pcell between the different duplex modes.

Embodiment 1 may be applied even to a UE which does not have capability supporting dual-duplex mode for supporting a joint operation and CA of TDD and FDD. Specifically, Embodiment 1 enables the UE to perform a non-CA operation and a CA operation in an FDD-only mode, when the UE accesses a network capable of supporting the relevant FDD-TDD dual-mode although the UE has the FDD-only mode supporting only FDD and can perform non-CA and CA. Also, in the case of the UE which has a TDD-only mode supporting only TDD and can perform non-CA and CA, as described above, Embodiment 1 enables the UE, which has the TDD-only mode, to smoothly perform a non-CA operation and a CA operation in the TDD-only mode, when the UE accesses a network capable of supporting the relevant FDD-TDD dual-mode.

Embodiment 2: a Method for Configuring One Pcell and Configuring Different CCs Using an Identical Duplex Mode or Different Duplex Modes, as an Scell Even when CCs supporting a FDD mode and a TDD mode are mixed, the setting of a Pcell and an Scell according to the FDD mode and the TDD mode may be performed in an existing scheme used in one duplex mode. For example, there is a method for configuring one Pcell and configuring the remaining CCs as an Scell as in a scheme which is set for CA of only FDD carriers and CA of only TDD carriers. Detailed embodiments in the relevant case are as follows.

When one carrier supporting FDD is set as a Pcell and the remaining carriers (i.e., carriers supporting TDD or carriers supporting FDD except for the carrier which is set as the Pcell) are configured as an Scell, the one carrier and the remaining carriers may be set to configure A-1, A-2, A-3, A-4, and A-5 as follows.

configuration A-1 {Pcell(FDD), Scell-0(TDD)}
configuration A-2 {Pcell(FDD), Scell-0(TDD), Scell-1 (FDD or TDD)}
configuration A-3 {Pcell(FDD), Scell-0(FDD), Scell-1 (TDD), Scell-2(FDD or TDD)}
configuration A-4 {Pcell(FDD), Scell-0(TDD), Scell-1 (FDD), Scell-2(FDD or TDD)}
configuration A-5 {Pcell(FDD), Scell-0(TDD), Scell-1 (FDD), Scell-2(FDD or TDD), Scell-3(FDD or TDD)}

When one carrier supporting TDD is set as a Pcell and the remaining carriers (i.e., carriers supporting FDD or carriers supporting TDD except for the carrier which is set as the Pcell) are configured as an Scell, the one carrier and the remaining carriers may be set to configure B-1, B-2, B-3, B-4, and B-5 as follows.

configuration B-1 {Pcell(TDD), Scell-0(FDD)}
configuration B-2 {Pcell(TDD), Scell-0(FDD), Scell-1 (TDD or FDD)}
configuration B-3 {Pcell(TDD), Scell-0(TDD), Scell-1 (FDD), Scell-2(TDD or FDD)}
configuration B-4 {Pcell(TDD), Scell-0(FDD), Scell-1 (TDD), Scell-2(TDD or FDD)}
configuration B-5 {Pcell(TDD), Scell-0(FDD), Scell-1 (TDD), Scell-2(TDD or FDD), Scell-3(TDD or FDD)}

When the relevant method is used and an Scell is added, a parameter may be explicitly added for indicating duplex modes of FDD and TDD in such a manner as to discriminate between the duplex modes of FDD and TDD. Alternatively, the relevant method enables recognition of whether the added Scell is an Scell supporting FDD duplex or an Scell supporting TDD duplex according to an implicitly-indicated DL carrier frequency.

Embodiment 3: an FDD-Prioritized Pcell Definition Method

The third embodiment 3 is a method for first setting a CC supporting the FDD mode as a Pcell when performing a joint operation and CA of TDD and FDD. In contrast, when a CC supporting the TDD mode first as a Pcell, it is required to define respective timings for transmitting PUSCH/PDSCH/PHICH/UCI according to UL-DL subframe configuration which is set for a CC supporting the relevant TDD mode. Specifically, it is required to set the respective timings for transmitting PUSCH/PDSCH/PHICH/UCI between FDD and TDD. To this end, it is required to define a timing relation for each channel associated with FDD and TDD. On the other hand, when a CC supporting FDD is first set as a Pcell in Embodiment 3, a UL carrier exists as a frequency resource independent of a DL carrier in FDD differently from TDD in which a DL subframe and a UL subframe exist on an identical carrier. Accordingly, with respect to transmission of UCI as feedback transmission of a PDSCH transmitted in TDD, the relevant UCI may be transmitted through a PUCCH or a PUSCH in a UL subframe on a UL carrier used in the relevant FDD, and thus it is not necessary to change legacy UEs. Therefore, as compared with the method for defining/setting/designating a Pcell with TDD as first priority, without largely changing the existing technical configuration, the third embodiment 3 enables the UE, which supports a joint operation and CA of TDD and FDD proposed in Embodiment 3, to support a joint operation and CA of TDD and FDD through only the configuration for defining/setting/designating a Pcell with FDD as first priority when the UE just operates in a network capable of supporting the relevant joint operation and CA of TDD and FDD.

[A Method and an Apparatus for Controlling CA]

Figure 8:
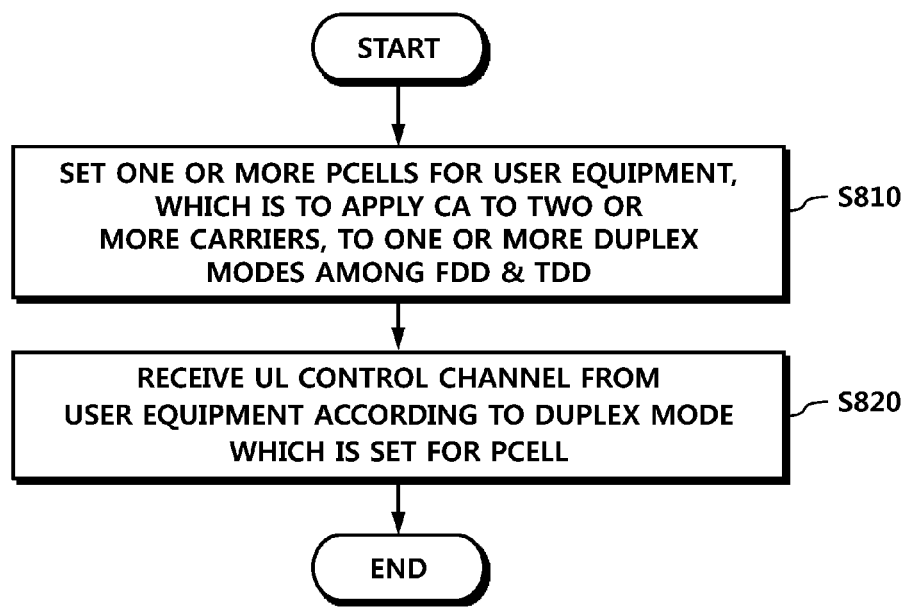
FIG. 8 is a view illustrating an operation of a base station according to an embodiment of the present disclosure.

FIG. 8 is a view illustrating an operation of a BS according to an embodiment of the present disclosure. In step S810, a BS controls the setting of a Pcell in different duplex modes. A UE performs CA of more than two carriers. The BS sets at least one Pcell with one or more of duplex modes among a FDD mode and a TDD mode. In step S820, the BS receives a UL control channel from the UE according to the duplex mode which is set for the Pcell. The respective embodiments will be described in detail below.

In step S810 of Embodiment 1 described above, when one of the carriers of FDD is set as a first Pcell, one of carriers of TDD can be set as a second Pcell. The setting of the one carrier of TDD as the second Pcell signifies that the set carrier is an Scell but can perform a function of a Pcell. One of the carriers of TDD may be set as the first Pcell and one of the carriers of FDD may be set as the second Pcell. In this case, in step S820, the BS receives a PUCCH, which is a UL control channel, on the carrier set as the first Pcell or the second Pcell.

Alternatively, in step S820, when pieces of UCI to be transmitted through the PUCCH, which is the UL control channel, piggyback on a PUSCH, the BS may receive the PUSCH including the information to be transmitted through the PUCCH on the carrier which is set as the first Pcell or the second Pcell.

In contrast, when the first Pcell or the second Pcell does not include the PUSCH, in step S820, UCI may piggyback on a PUSCH of an Scell having the lowest index which is scheduled to transmit a PUSCH among Scells of a duplex mode which is identical to that of the first Pcell or the second Pcell, and the BS may receive the UCI. A first duplex mode may be FDD and a second duplex mode may be TDD. Alternatively, the first duplex mode may be TDD and the second duplex mode may be FDD.

Also, when the UE supports the different duplex modes, the UE may set, as a Pcell, a carrier of a duplex mode according to the relevant duplex mode of the carrier on which a synchronization channel is transmitted that the UE has first detected among a synchronization channel used for a carrier of the first duplex mode and a synchronization channel used for a carrier of the second duplex mode, and thereby the UE and the BS may perform an access procedure, namely, a cell search procedure, a random access procedure, a handover procedure, and the like. Specifically, in the case of the access procedure, the BS may set the carrier of the duplex mode, in which the synchronization channel is first detected, as the Pcell.

In contrast, in setting a Pcell carrier on which the UE supporting different duplex modes performs an access procedure, the BS may assign a priority to a particular duplex mode and may set the Pcell carrier on which the access procedure is performed. Specifically, the BS may assign a priority to one of the FDD mode and the TDD mode and may set the Pcell carrier which allows the access procedure to be performed.

The first embodiment 1 will be described in detail with reference to FIG. 9.

In order to apply the second embodiment 2, the Pcell is one, a duplex mode of the Pcell is FDD or TDD, and it is possible to set, as an Scell, a carrier of a duplex mode different from that of the Pcell, or a carrier, of which a duplex mode is identical to that of the Pcell but which is not the Pcell. The second embodiment 2 will be described in detail with reference to FIG. 10.

In order to apply the third embodiment 3, the Pcell is one, and a priority is assigned to a carrier of FDD in order to set the Pcell with the carrier of FDD. The third embodiment 3 will be described in detail with reference to FIG. 11.

In FIG. 8, the setting of a Pcell may include the transmission of information indicating a Pcell from the BS to the UE or the transmission of a signal including information on designation of a Pcell.

Figure 9:
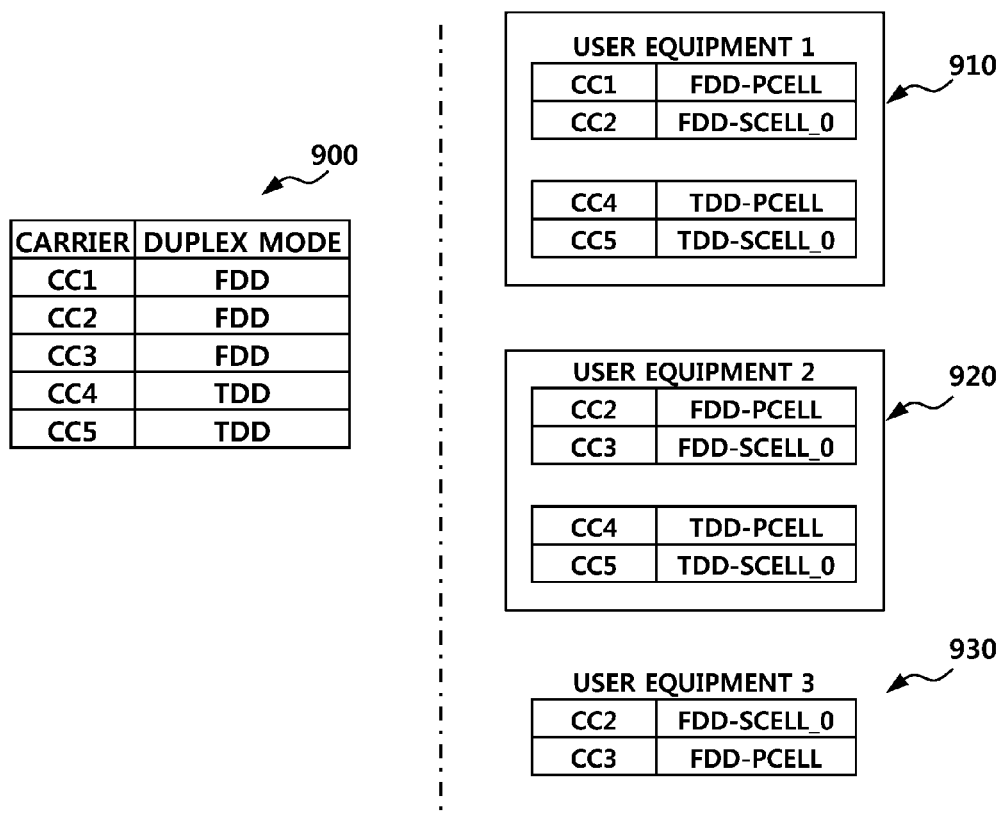
FIG. 9 is a view illustrating a first embodiment (Embodiment 1) of the present disclosure.

FIG. 9 is a view illustrating the first embodiment 1.

When the BS operates CC1, CC2, and CC3 as FDD carriers and operates CC4 and CC5 as TDD carriers as indicated by reference numeral 900, the setting of FDD and TDD by a UE 1 supporting different duplex modes and a result of setting a Pcell/Scell by the UE 1 are indicated by reference numeral 910. Also, the setting of FDD and TDD by a UE 2 and a result of setting a Pcell/Scell by the UE 2 are indicated by reference numeral 920. The UE 1 and the UE 2 both set an FDD-Pcell and a TDD-Pcell, and transmits/receives DL data/control information and UL control/data information in a state of setting a Pcell and an Scell for each duplex mode. Specifically, each of the UE 1 and the UE 2 set FDD-Pcell, FDD-Scell_0, TDD-Pcell, and TDD-Scell_0.

On the other hand, a UE 3 which is a legacy UE first sets an FDD carrier as a Pcell. Specifically, the UE 3 sets an FDD-Pcell for CC3 and sets an FDD-Scell for CC2.

Figure 10:
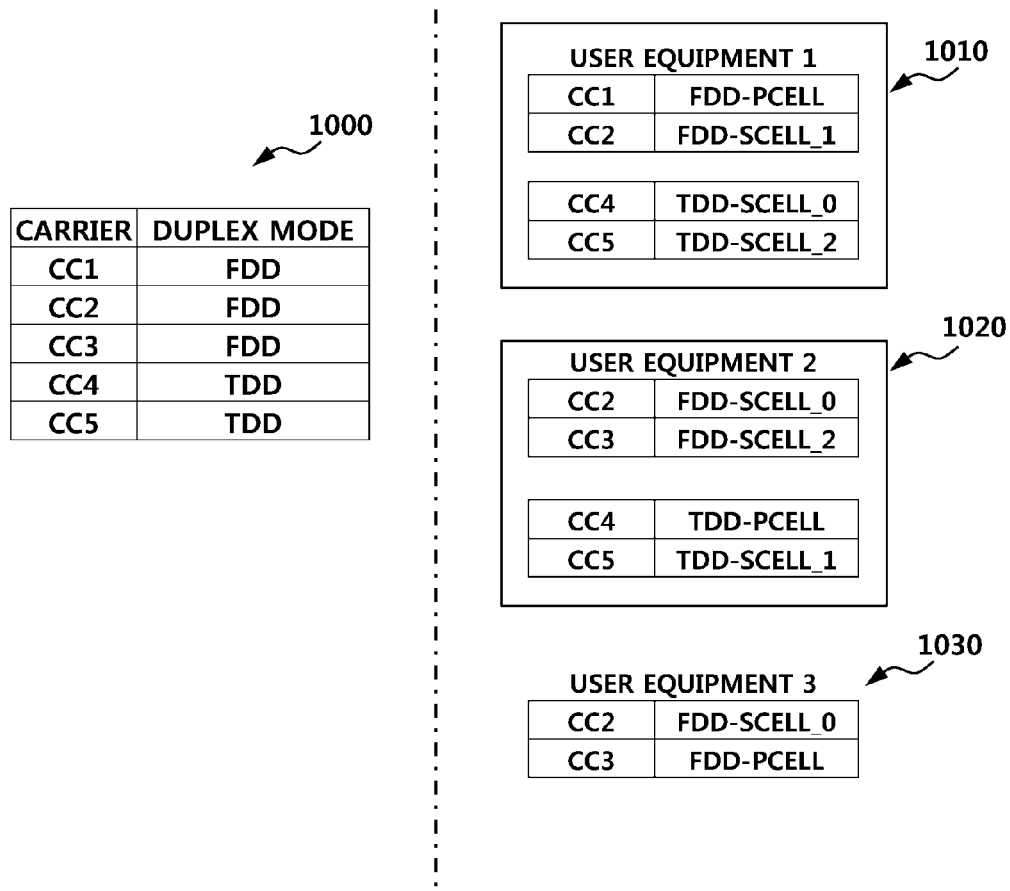
FIG. 10 is a view illustrating a second embodiment (Embodiment 2) of the present disclosure.

FIG. 10 is a view illustrating the second embodiment 2.

When the BS operates CC1, CC2, and CC3 as FDD carriers and operates CC4 and CC5 as TDD carriers as indicated by reference numeral 1000 as described with reference to FIG. 9. The setting of FDD and TDD by the UE 1 supporting different duplex modes and the setting of a Pcell/Scell by the UE 1 are indicated by reference numeral 1010. Also, the setting of FDD and TDD by the UE 2 and the setting of a Pcell/Scell by the UE 2 are indicated by reference numeral 1020. The UE 1 operates FDD-Pcell in CC1, and the UE 2 operates TDD-Pcell in CC4. The carriers other than CC1 and CC4 are operated as Scells. Configurations A-1, A-2, A-3, A-4, and A-5 or configurations B-1, B-2, B-3, B-4, and B-5 as described above in the second embodiment 2 may be applied to configurations indicated by reference numerals 1010 and 1020. The UE 3 which is a legacy UE is configured identically to the configuration indicated by reference numeral 930 of FIG. 9. The UE 1 sets FDD-Pcell, FDD-Scell_1, TDD-Scell_0, and TDD-Scell_2, and the UE 2 sets FDD-Scell_0, FDD-Scell_2, TDD-Pcell, and TDD-Scell_1.

Figure 11:
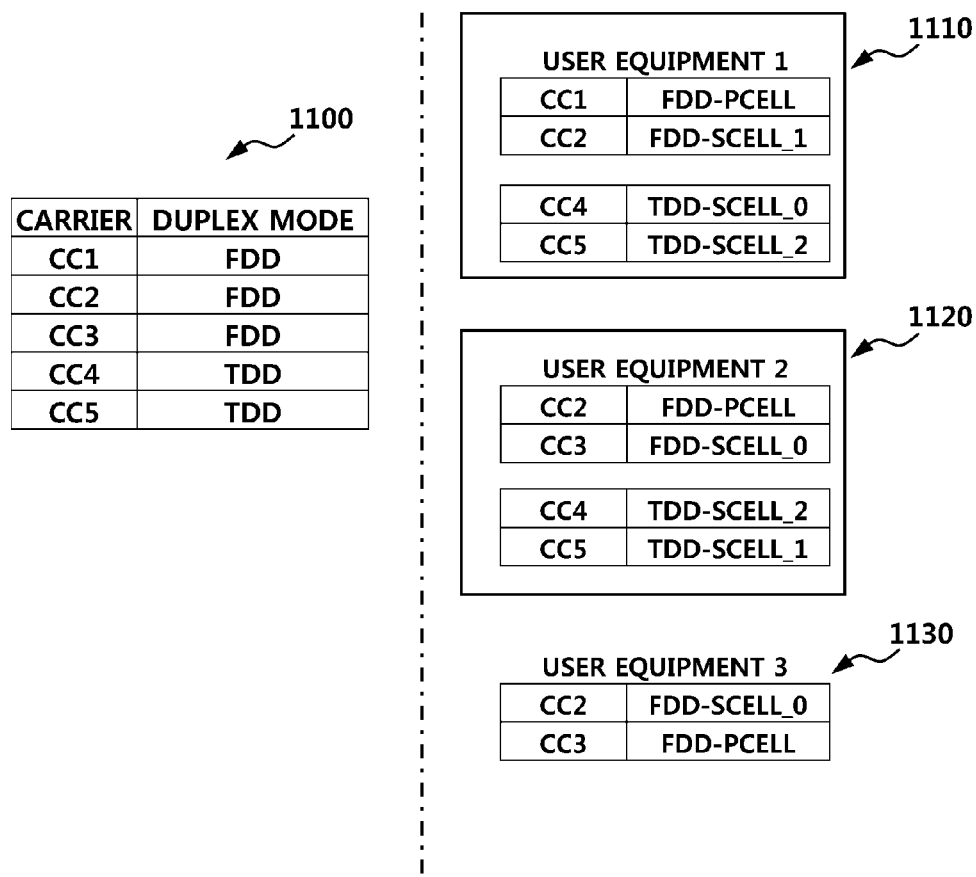
FIG. 11 is a view illustrating a third embodiment (Embodiment 3) of the present disclosure.

FIG. 11 is a view illustrating the third embodiment 3.

When the BS operates CC1, CC2, and CC3 as FDD carriers and operates CC4 and CC5 as TDD carriers as indicated by reference numeral 1100 as described with reference to FIG. 9. The UE 1 and the UE 2, which support different duplex modes, both set FDD for a Pcell as indicated by reference numerals 1110 and 1120. The UE 3 which is a legacy UE is configured identically to the configuration indicated by reference numeral 930 of FIG. 9. The UE 1 sets FDD-Pcell, FDD-Scell_1, TDD-Scell_0, and TDD-Scell_2, and the UE 2 sets FDD-Pcell, FDD-Scell_0, TDD-Pcell_2, and TDD-Scell_1.

In FIG. 9 to FIG. 11, the UE 1, the UE 2, and the UE 3 are for expressing that the UE 1, the UE 2, and the UE 3 may be set to be capable of configuring a Pcell and an Scell in a UE-specific manner. The UE 1, the UE 2, and the UE 3 do not imply that the setting of a Pcell and the configuration of an Scell by the UE 1 may be different from the setting of a Pcell and the configuration of an Scell by the UE 2 but the setting of a Pcell and the configuration of an Scell by the UE 1 are always different from the setting of a Pcell and the configuration of an Scell by the UE 2. According to the operation of a network, the setting of a Pcell and the configuration of an Scell by the UE 1 may be set to be identical to the setting of a Pcell and the configuration of an Scell by the UE 2.

Figure 12:
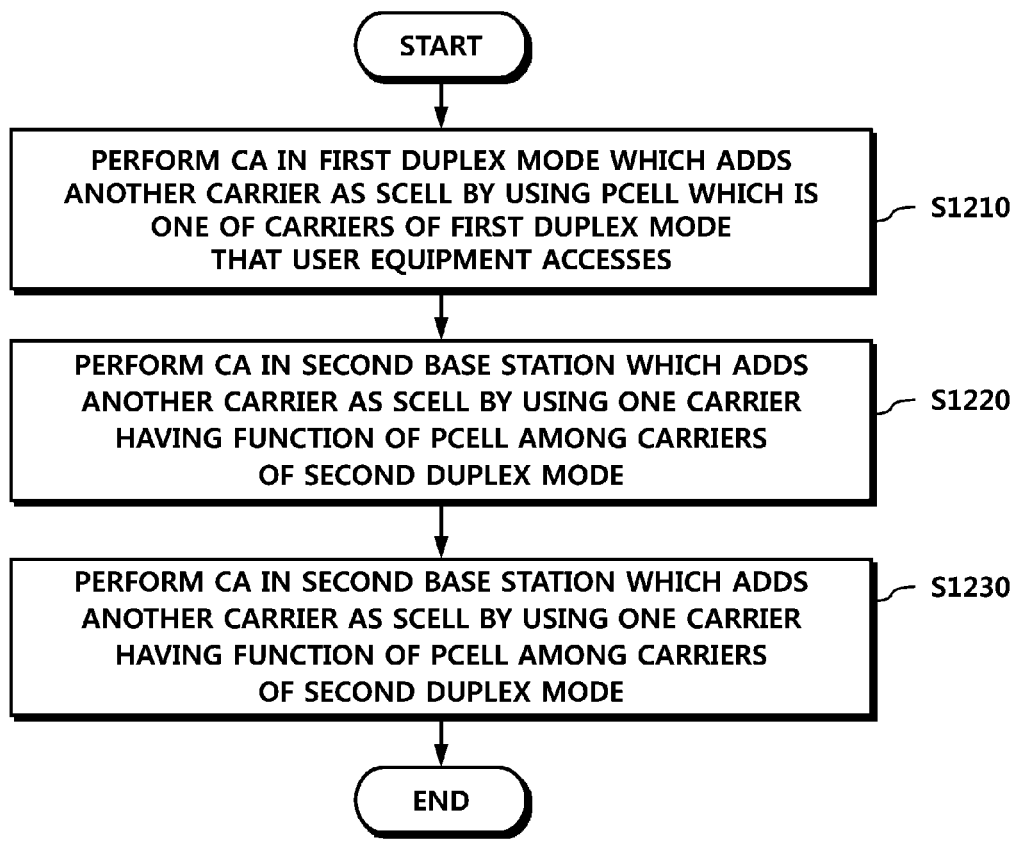
FIG. 12 is a view illustrating an operation of a base station in accordance with the first embodiment of the present disclosure.

FIG. 12 is a view illustrating an operation of a BS in accordance with a first embodiment of the present disclosure.

In step S1210, in order to control CA in different duplex modes, the BS performs CA in a first duplex mode which adds another carrier as an Scell by using a Pcell which is one of carriers of the first duplex mode that the UE accesses. In step S1220, the BS performs CA in a second BS which adds another carrier as an Scell by using one carrier having a function of a Pcell among carriers of a second duplex mode. In step S1230, the BS transmits/receives a DL channel and a UL channel of each of the first duplex mode and the second duplex mode, according to the setting of the Pcell and the Scell in each of the first duplex mode and the second duplex mode.

Also, the step S1230 of transmitting/receiving the DL channel and the UL channel includes: receiving a PUSCH including UCI on a Pcell if the carrier having the function of the relevant Pcell includes the PUSCH, or causing the UCI to piggyback on a PUSCH of an Scell having the lowest index, in which the PUSCH is scheduled among Scells of the first duplex mode or the second duplex mode, and receiving the UCI through the relevant PUSCH if the carrier having the function of the Pcell does not include the PUSCH, when a PUCCH is set to be received on the carrier having the function of the Pcell or the UCI is set to piggyback on the PUSCH.

Then, the UE may set a carrier of a duplex mode as a Pcell according to the relevant duplex mode of the carrier on which a synchronization channel is transmitted that the UE has first detected among a synchronization channel used for the carrier of the first duplex mode and a synchronization channel used for the carrier of the second duplex mode, and thereby the UE and the BS may perform an access procedure, namely, a cell search procedure, a random access procedure, a handover procedure, and the like. Specifically, in the case of the access procedure, the BS may set the carrier of the duplex mode, in which the synchronization channel is first detected, as the Pcell.

In contrast, in setting a Pcell carrier on which the UE supporting different duplex modes performs an access procedure, the BS may set a priority to be assigned to a particular duplex mode and may set the Pcell carrier on which the access procedure is performed. Specifically, the BS may set one of the FDD duplex mode and the TDD duplex mode to have a priority, and may set the Pcell carrier which allows the access procedure to be performed.

Figure 13:
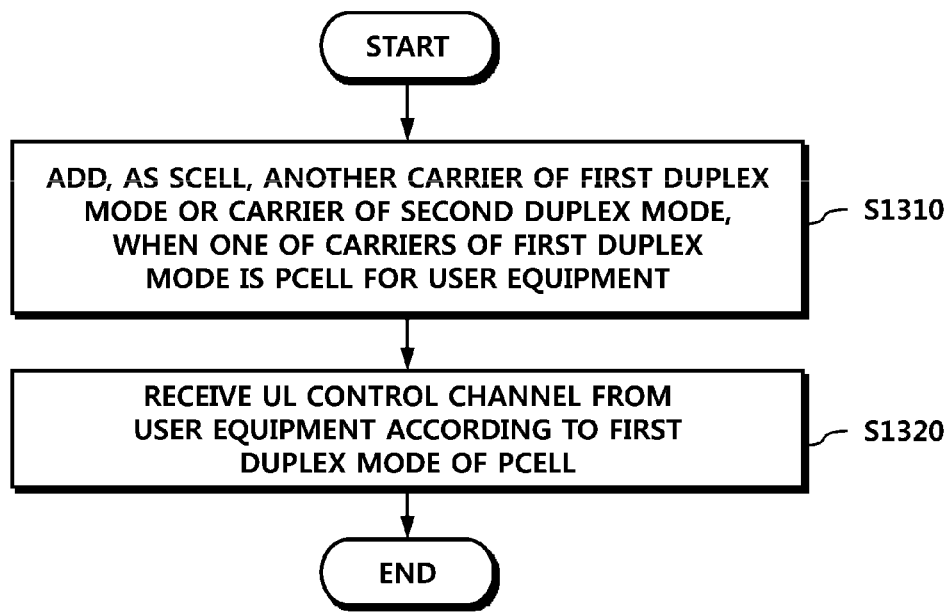
FIG. 13 is a view illustrating an operation of a base station in accordance with the second and third embodiments of the present disclosure.

FIG. 13 is a view illustrating an operation of a BS in accordance with the second and third embodiments of the present disclosure.

In step S1310, in order to control CA in different duplex modes, when one of carriers of a first duplex mode is a Pcell for the UE, the BS adds, as an Scell, another carrier of the first duplex mode or a carrier of a second duplex mode. In step S1320, the BS receives a UL control channel from the UE according to the first duplex mode of the Pcell.

In the second embodiment 2, a separate duplex mode may be indicated when an Scell is added. Specifically, in step S1310, information including the duplex mode of the carrier may be transmitted to the UE, and the UE uses the duplex mode.

As in the third embodiment 3, a Pcell may always be implemented in such a manner as to assign a priority to FDD. Specifically, the BS may control such that the first duplex mode is FDD.

Figure 14:
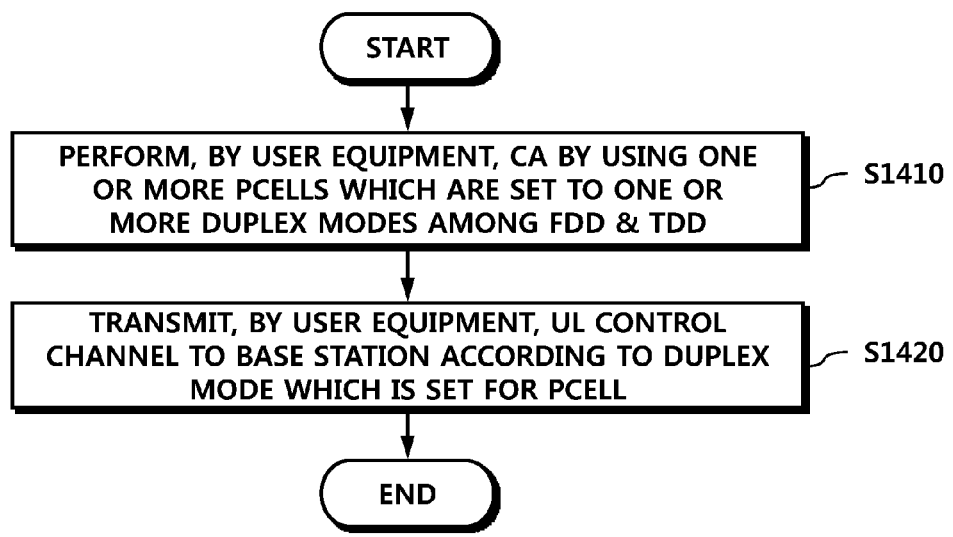
FIG. 14 is a view illustrating an operation of a user equipment according to an embodiment of the present disclosure.

FIG. 14 is a view illustrating an operation of a UE according to an embodiment of the present disclosure.

The setting of a Pcell in different duplex modes is described. In step S1410, the UE performs CA by using one or more Pcells which are set to one or more duplex modes among FDD and TDD. In step S1420, the UE transmits a UL control channel to the BS according to the duplex mode which is set for the Pcell.

Referring to FIG. 14, the setting of the Pcell may include receiving, by the UE, information indicating a Pcell from the BS, or receiving, by the UE, a signal including information on designation of a Pcell.

When the first embodiment 1 is applied, in step S1410 of performing the CA, one of carriers of the FDD is set as a first Pcell; one of carriers of the TDD is set as a second Pcell; and with respect to the other carriers, according to the respective duplex modes, the carriers of the FDD, which are not the first Pcell, are set as FDD-Scells, and the carriers of the TDD, which are not the second Pcell, are set as TDD-Scells. One of the carriers of the TDD may be set as the first Pcell and one of the carriers of the FDD may be set as the second Pcell. To be set as the second Pcell implies that the carrier set as the second Pcell is an Scell but is set to perform a function of a Pcell.

Also, in step S1420 for the transmission, the UE transmits a PUCCH which is a UL control channel including UCI on the first Pcell or the second Pcell. Alternatively, when the UE sets UCI to piggyback on a PUSCH, if a carrier having a function of a Pcell includes the PUSCH, the UE transmits the PUSCH including the UCI on the relevant Pcell. Alternatively, when the first Pcell or the second Pcell does not include a PUSCH, the UE causes UCI to piggyback on a PUSCH of an Scell having the lowest index, in which the PUSCH is scheduled among Scells of a duplex mode identical to that of the first Pcell or the second Pcell, and transmits the UCI.

Also, is the operations of the UE may include setting, by the UE, a carrier of a duplex mode according to the relevant duplex mode of the carrier on which a synchronization channel is transmitted which has first been detected among a synchronization channel used for a carrier of the first duplex mode and a synchronization channel used for a carrier of the second duplex mode, and thereby performing, by the UE and the BS, an access procedure, namely, a cell search procedure, a random access procedure, a handover procedure, and the like.

In contrast, in the setting a Pcell carrier on which the UE supporting different duplex modes performs an access procedure, the UE performs the access procedure on a Pcell carrier that the BS has set such that a particular duplex mode has a priority. Specifically, the UE performs the relevant access procedure, according to the FDD duplex mode or the TDD duplex mode that the BS has set to have a priority.

Operations related to the first embodiment 1 are similar to that described with reference to FIG. 9.

According to the second embodiment 2, the Pcell is one, and with respect to the UE, one or more carriers other than the Pcell are set as a carrier of a duplex mode identical or different to/from FDD or TDD which is set for the Pcell, when the Pcell is set to FDD or TDD. Configurations A-1, A-2, A-3, A-4 and A-5 or configurations B-1, B-2, B-3, B-4 and B-5 as described above in the second embodiment 2 may be applied. Operations related to the second embodiment 2 are similar to that described with reference to FIG. 10.

According to the third embodiment 3, the Pcell is one, and the Pcell is set in such a manner as to assign a priority to FDD. Operations related to the third embodiment 3 are similar to those described above with reference to FIG. 11.

Operations of the UE were summarized with reference to the first embodiment 1 and the second and third embodiments 2 and 3. Such operations of the UE will be described in detail with referenced to FIG. 15 and FIG. 16.

Figure 15:
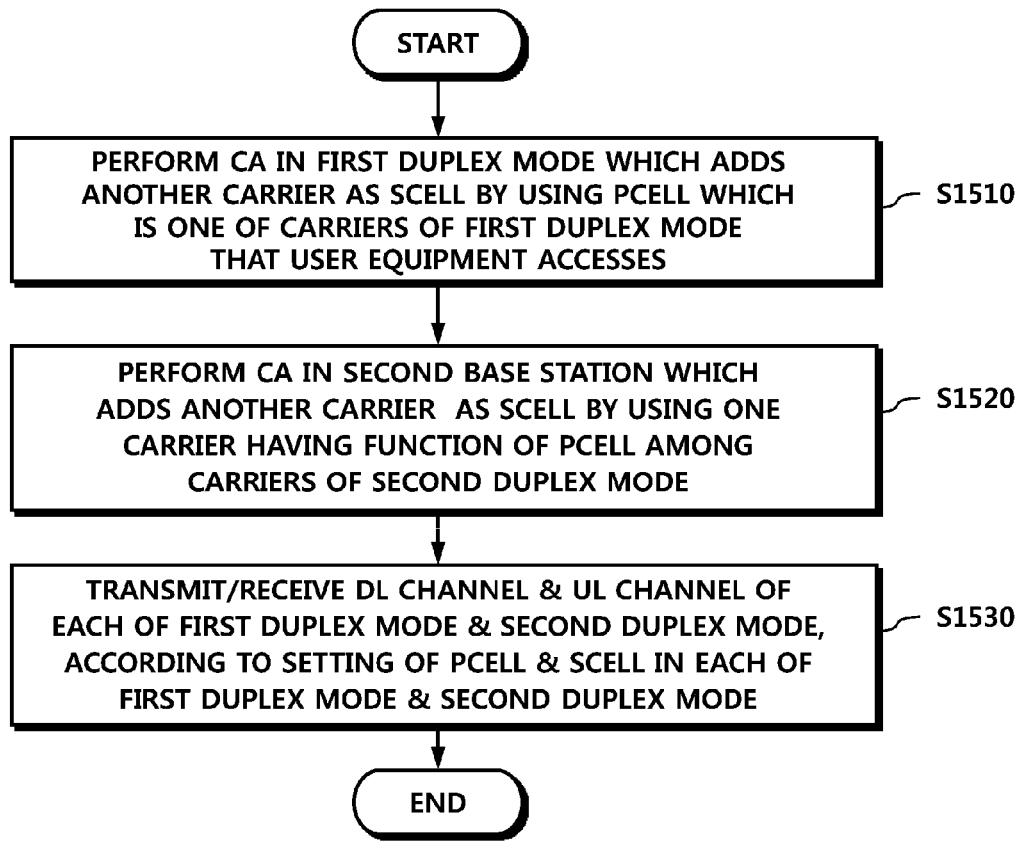
FIG. 15 is a view illustrating an operation of a user equipment in accordance with the first embodiment of the present disclosure.

FIG. 15 is a view illustrating an operation of a UE according to the first embodiment of the present disclosure.

In step S1510, in order to control CA in different duplex modes, the UE performs CA in a first duplex mode which adds another carrier as an Scell by using a Pcell which is one of carriers of the first duplex mode that the UE accesses. In step S1520, the UE performs CA in a second BS which adds another carrier as an Scell by using one carrier having a function of a Pcell among carriers of a second duplex mode. In step S1530, the UE transmits/receives a DL channel and a UL channel of each of the first duplex mode and the second duplex mode, according to the setting of the Pcell and the Scell in each of the first duplex mode and the second duplex mode.

Here, step S1530 further includes: receiving a PUSCH including UCI on a Pcell if the carrier having the function of the relevant Pcell includes the PUSCH, or causing the UCI to piggyback on a PUSCH of an Scell having the lowest index, in which the PUSCH is scheduled among Scells of the first duplex mode or the second duplex mode, and transmitting the UCI through the PUSCH if the carrier having the function of the Pcell does not include the PUSCH, when a PUCCH is set to be transmitted on the carrier having the function of the Pcell or the UCI is set to piggyback on the PUSCH.

Then, the UE may set, as a Pcell, a carrier of a duplex mode according to the relevant duplex mode of the carrier on which a synchronization channel is transmitted which has first been detected among a synchronization channel used for a carrier of the first duplex mode and a synchronization channel used for a carrier of the second duplex mode, and thereby the UE and the BS may perform an access procedure, namely, a cell search procedure, a random access procedure, a handover procedure, and the like. Specifically, in the case of the access procedure, the BS may set the carrier of the duplex mode, in which the synchronization channel is first detected, as a Pcell.

In contrast, in setting a Pcell carrier on which the UE supporting different duplex modes performs an access procedure, the UE performs an access procedure on a Pcell carrier that the BS has set such that a particular duplex mode has a priority. Specifically, the UE performs the relevant access procedure, according to the FDD duplex mode or the TDD duplex mode that the BS has set to have a priority.

Figure 16:
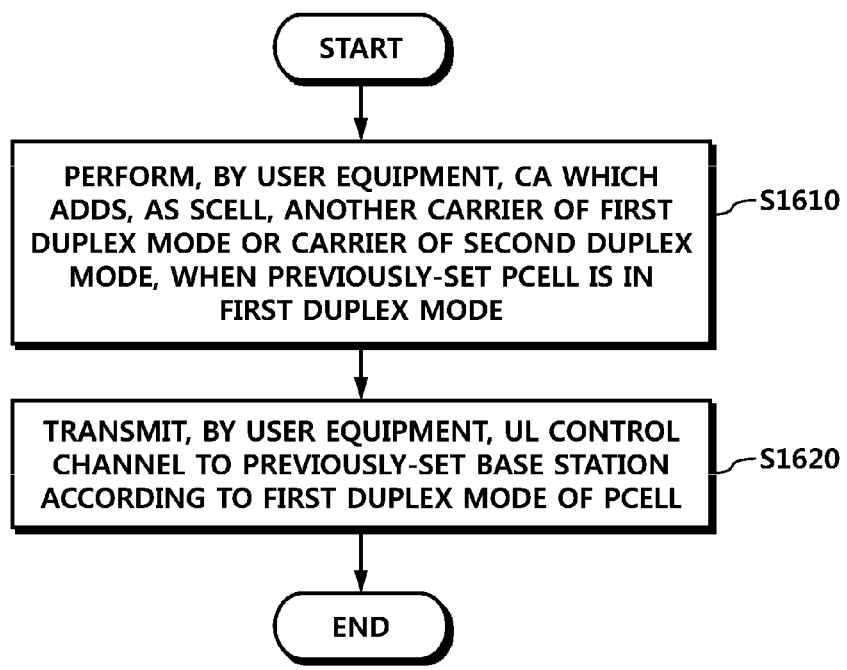
FIG. 16 is a view illustrating an operation of a user equipment in accordance with the second and third embodiments of the present disclosure.

FIG. 16 is a view illustrating an operation of a UE according to the second and third embodiments of the present disclosure.

In step S1610, when a previously-set Pcell is in a first duplex mode, the UE performs CA which adds, as an Scell, another carrier of the first duplex mode or a carrier of a second duplex mode. In step S1620, the UE transmits a UL control channel to the previously-set BS according to the first duplex mode of the Pcell.

In the second embodiment 2, a duplex mode of the Pcell is FDD or TDD, and thus the UE may receive, from the BS, information including the duplex mode of the carrier in step S1610 of performing the CA which adds another carrier as an Scell.

Meanwhile, in the third embodiment 3, prioritization may be performed such that a carrier of FDD becomes a Pcell. In this case, the first duplex mode is FDD.

When CA is performed by using carriers having the different TDD and FDD duplex modes, an ambiguity problem is solved between the UE and the BS regarding an operation of the UE, which operates according to the setting of a Pcell between the UE and the BS, and setting by the BS. Accordingly, accuracy is achieved for an access procedure, UL/DL data transmission, and an operation of transmission/reception of a UL/DL control channel including an HARQ operation, which are performed between the UE and the BS, and thereby the reliability of data transmission between the UE and the BS can be ensured. As a result, a data transmission rate in UL/DL can be increased.

Figure 17:
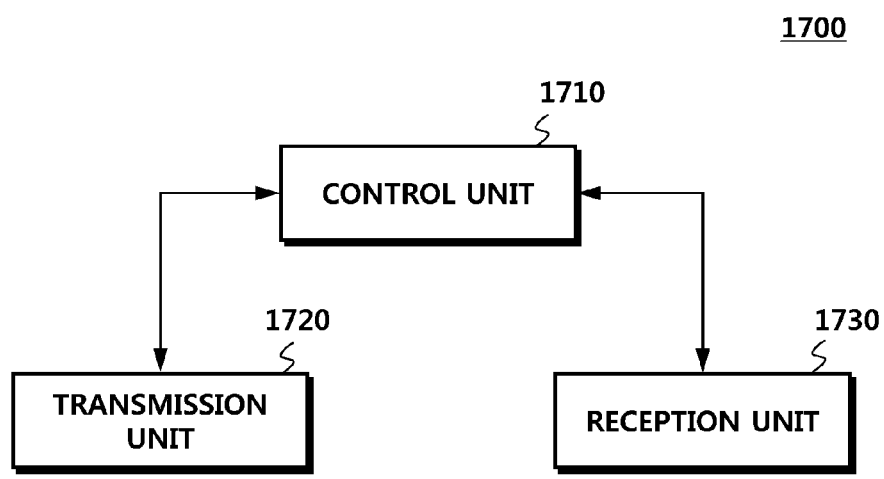
FIG. 17 is a view illustrating a configuration of a base station according to an embodiment of the present disclosure.

FIG. 17 is a view illustrating a configuration of a BS according to an embodiment of the present disclosure.

Referring to FIG. 17, the BS 1700 includes a control unit 1710, a transmission unit 1720, and a reception unit 1730.

The control unit 1710 controls an overall operation of the BS according to the setting of a Pcell which considers a joint operation and CA in different duplex modes, FDD and TDD, which is required to perform the above-described embodiments of the present disclosure.

Also, in such a method for setting a Pcell, the control unit 1710 controls an overall operation of the BS for designating a Pcell/Scell according to different duplex modes, which may be applied regardless of a duplex mode when CA, a joint operation, and a dual connectivity are performed in an environment of different macrocell and small cell (or macro eNB and small cell eNB).

The transmission unit 1720 and the reception unit 1730 are used to transmit and receive signals, messages, and data, which are required to perform the above-described embodiments of the present disclosure, to/from the UE.

The BS 1700 controls the setting of a Pcell in different duplex modes, the transmission unit 1720 transmits a DL channel to the UE, and the control unit 1710 sets one or more Pcells for the UE, which is to apply CA to two or more carriers, to one or more duplex modes among FDD and TDD. Also, the reception unit 1730 receives a UL control channel from the UE according to the duplex mode which is set for the Pcell.

The setting of the Pcell includes transmitting, by the transmission unit 1720, information indicating a Pcell to the UE, or transmitting, by the transmission unit 1720, a signal including information on designation of a Pcell to the UE.

According to the first embodiment 1, if one of carriers of the FDD is previously set as a first Pcell, the control unit 1710 may set one of carriers of the TDD as a second Pcell. Conversely, the control unit 1710 may set one of carriers of the FDD as the second Pcell when one of carriers of the TDD is previously set as the first Pcell.

Then, the control unit 1710 enables the UE to set, as a Pcell, a carrier of a duplex mode according to the relevant duplex mode of the carrier on which a synchronization channel is transmitted that the UE has first detected among a synchronization channel used for a carrier of a first duplex mode and a synchronization channel used for a carrier of a second duplex mode, and thereby enables the UE and the BS to perform an access procedure, namely, a cell search procedure, a random access procedure, a handover procedure, and the like. Specifically, in the case of the access procedure, the BS may set the carrier of the duplex mode, in which the synchronization channel is first detected, as the Pcell.

In contrast, in setting a Pcell carrier on which the UE supporting different duplex modes performs an access procedure, the control unit 1710 may set a priority to be assigned to a particular duplex mode and may set the Pcell carrier on which the access procedure is performed. Specifically, the control unit 1710 may set one of the FDD duplex mode and the TDD duplex mode to have a priority, and may set the Pcell carrier which allows the access procedure to be performed.

Also, the reception unit 1730 may receive a PUSCH including UCI on a Pcell if the carrier having the function of the relevant Pcell includes the PUSCH, or the reception unit 1730 may allow the UCI to piggyback on a PUSCH of an Scell having the lowest index, in which the PUSCH is scheduled among Scells of a duplex mode identical to that of the first Pcell or the second Pcell. The reception unit 1730 may receive the UCI if the first Pcell or the second Pcell does not include the PUSCH, when a PUCCH is set to be received on the carrier having the function of the Pcell or the UCI is set to piggyback on the PUSCH.

According to the second embodiment 2, the control unit 1710 may set the Pcell to be one, may set FDD or TDD for the Pcell, and may set one or more carriers other than the Pcell, as a carrier of a duplex mode identical or different to/from FDD or TDD which is set for the Pcell.

According to the third embodiment 3, the control unit 1710 may set the Pcell to be one, and the control unit 1710 may set the Pcell in such a manner as to assign a priority to FDD.

A configuration of the BS, which controls CA in different duplex modes, will be described in detail below.

The control unit 1710, according to the first embodiment of the present disclosure, performs CA in the first duplex mode which adds another carrier as an Scell by using a Pcell which is one of carriers of the first duplex mode that the UE accesses. The control unit 1710 performs CA in a second BS which adds another carrier as an Scell by using one carrier having a function of a Pcell among carriers of the second duplex mode. Then, the transmission unit 1720 transmits a DL channel of each of the first duplex mode and the second duplex mode, according to the setting of a Pcell and an Scell of each of the first duplex mode and the second duplex mode, and the reception unit 1730 receives a UL channel of each of the first duplex mode and the second duplex mode.

Also, in order to apply the piggyback rules, the reception unit 1730 receives a PUCCH on the carrier having the function of the Pcell. Alternatively, when the carrier having the function of the Pcell does not include a PUSCH, the reception unit 1730 causes UCI to piggyback on a PUSCH on an Scell having the lowest index among Scells of the second duplex mode, and receives the UCI. When a legacy UE performs an access procedure through a channel first detected among a synchronization channel used for a carrier of the first duplex mode and a synchronization channel used for a carrier of the second duplex mode, the control unit 1710 may set, as a Pcell, the carrier of the duplex mode of the channel through which the access procedure has been performed.

In the second and third embodiments, one Pcell exists. Specifically, when one of carriers of the first duplex mode is a Pcell for the UE, the control unit 1710 adds, as an Scell, another carrier of the first duplex mode or a carrier of the second duplex mode, and the reception unit 1730 receives a UL control channel from the UE according to the first duplex mode of the Pcell.

When an Scell is added according to the second embodiment 2, a duplex mode may be separately indicated. Specifically, in order to add the carrier as an Scell, the control unit 1710 may control the transmission unit 1720 to transmit information including the duplex mode of the carrier to the UE.

According to the third embodiment 3, a Pcell may always be implemented in such a manner as to assign a priority to FDD. Specifically, the first duplex mode may be FDD.

Figure 18:
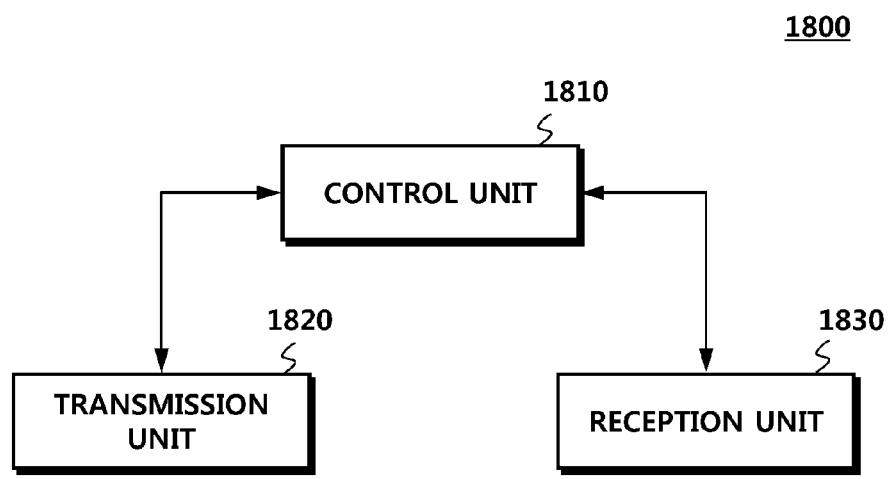
FIG. 18 is a view illustrating a configuration of a user equipment according to an embodiment of the present disclosure.

FIG. 18 is a view illustrating a configuration of a UE according to an embodiment of the present disclosure.

Referring to FIG. 18, the UE 1800 includes a reception unit 1830, a control unit 1810, and a transmission unit 1820.

The reception unit 1830 receives DL control information, DL data, and a message through a relevant channel from the BS.

Also, in such a method for setting a Pcell by the UE required to perform the above-described embodiments of the present disclosure, the control unit 1810 controls an overall operation of the UE according to the setting of a Pcell which considers a joint operation and CA of FDD and TDD in different duplex modes.

The control unit 1810 controls an overall operation of the UE for designating a Pcell/Scell according to different duplex modes, which may be applied regardless of a duplex mode when CA, a joint operation, and a dual connectivity are performed in an environment of different macrocell and small cell (or macro eNB and small cell eNB) required to perform the above-described present.

The transmission unit 1820 transmits UCI, UL data, and a message through a relevant channel to the BS.

The UE 1800 sets a Pcell in different duplex modes and performs CA. The reception unit 1830 receives a DL channel from the BS, and the control unit 1810 performs CA by using one or more Pcells which are set to one or more duplex modes among FDD and TDD. Then, the transmission unit 1820 transmits a UL control channel to the BS according to the duplex mode which is set for the Pcell.

According to the first embodiment 1, the control unit 1810 performs CA in a first duplex mode which adds another carrier as an Scell by using a Pcell which is one of carriers of the first duplex mode that the UE accesses, and the control unit 1810 performs CA in a second BS which adds another carrier as an Scell by using one carrier having a function of a Pcell among carriers of a second duplex mode.

Also, the transmission unit 1820 transmits a UL channel of each of the first duplex mode and the second duplex mode, according to the setting of a Pcell and an Scell of each of the first duplex mode and the second duplex mode, and the reception unit 1830 receives a DL channel of each of the first duplex mode and the second duplex mode.

Here, when the transmission unit 1820 is set to transmit a PUCCH which is a UL control channel including UCI on the first Pcell and the second Pcell, or when the UE is set to cause the UCI to piggyback on a PUSCH in order to apply the piggyback rules, if a carrier having a function of a Pcell includes the PUSCH, the transmission unit 1820 transmits the PUSCH including the UCI on the relevant Pcell.

Alternatively, when the carrier having the function of the Pcell, the first Pcell or when the second Pcell does not include the PUSCH, the transmission unit 1820 allows the UCI to piggyback on a PUSCH of an Scell having the lowest index, in which the PUSCH is scheduled among Scells of the second duplex mode, and the transmission unit 1820 transmits the UCI.

Then, the control unit 1810 sets, as a Pcell, a carrier of a duplex mode according to the relevant duplex mode of the carrier on which a synchronization channel is transmitted which has first been detected among a synchronization channel used for a carrier of the first duplex mode and a synchronization channel used for a carrier of the second duplex mode, and thereby the UE and the BS perform an access procedure, namely, a cell search procedure, a random access procedure, a handover procedure, and the like.

In contrast, in setting a Pcell carrier on which the UE supporting different duplex modes performs an access procedure, the control unit 1810 performs the access procedure on a Pcell carrier that the BS has set such that a particular duplex mode has a priority. Specifically, the control unit 1810 controls such that the relevant access procedure is performed according to the FDD duplex mode or the TDD duplex mode that the BS has set to have a priority.

According to the second embodiment 2, the Pcell is one. If the Pcell is set to FDD or TDD, the control unit 1810 performs CA which sets one or more carriers other than the Pcell as a carrier of a duplex mode identical or different to/from FDD or TDD which is set for the Pcell.

According to the third embodiment 3, the Pcell may be one, and the Pcell may be set in such a manner as to assign a priority to FDD.

The setting of the Pcell includes receiving, by the UE 1800, information indicating a Pcell from the BS 1700, or receiving, by the UE 1800, a signal including information on designation of a Pcell from the BS 1700.

In order for the UE to control CA in different duplex modes, the control unit 1810 performs CA which sets, as a second Pcell, one of two or more carriers which are operated in the second duplex mode different from the first duplex mode of the previously-set first Pcell, and the transmission unit 1820 transmits a UL control channel to the BS according to a duplex mode which is set for each of the first Pcell and the second Pcell. Here, when the first Pcell or the second Pcell does not include a PUSCH, the transmission unit 1820 of the UE may allow UCI to piggyback on a PUSCH on an Scell having the lowest index among Scells of a duplex mode identical to that of the first Pcell or the second Pcell, and the transmission unit 1820 may transmit the UCI.

Meanwhile, in the second and third embodiments 2 and 3, when the previously-set Pcell is in the first duplex mode, the control unit 1810 performs CA which adds, as an Scell, the other carriers of the first duplex mode or a carrier of the second duplex mode. Then, the transmission unit 1820 transmits a UL control channel to the previously-set BS according to the first duplex mode of the Pcell.

According to the second embodiment 2, a duplex mode of a Pcell is FDD or TDD, and thus, in order to perform CA which adds another carrier as an Scell, the control unit 1810 may control the reception unit 1830 to receive information including the duplex mode of the carrier from the BS.

Meanwhile, according to the third embodiment 3, prioritization may be performed such that a carrier of FDD becomes a Pcell, and in this case, the first duplex mode is FDD.

[A Method and an Apparatus for Performing CA]

Hereinafter, a description will be made of a method and an apparatus for designating a Pcell/Scell according to different BS types, namely, a macro BS and a small cell BS, which may be applied regardless of a duplex mode when performing CA, a joint operation, and a dual connectivity in an environment of different macrocell and small cell (or macro eNB and small cell eNB).

In the present disclosure, the method for designating a Pcell/Scell according to different duplex modes as proposed above may be applied regardless of a duplex mode when CA and a joint operation are performed in an environment of different macrocell and small cell (or macro eNB and small cell eNB) and, more specifically, a method described below may be considered.

As an embodiment A, a BS type-dependent Pcell definition method may be provided. The BS type-dependent Pcell definition method may enable CA to be independently performed for each of different BSs similarly to the first embodiment 1 which sets CA to be capable of being independently performed for each duplex mode of the present disclosure. Specifically, the method enables a Pcell to be designated for each of eNBs of different types when the respective macro eNB and small cell eNB are set and enables an operation of the UE to be performed on a Pcell described in the present disclosure.

In other words, such a method may be a method for defining a Pcell depending on a BS. When a carrier belonging to a macro BS is set as one or more multiple CCs and a carrier belonging to a small cell BS is set as one or more multiple CCs, with respect to a CC configured for the UE, the method allows a Pcell to be designated for each of eNBs of different types.

The method allows each of a macro BS and a small cell BS to follow operations of a Pcell and Scells designated for each of the relevant BSs when each of the macro BS and the small cell BS transmits DL control/data and UL control/data. The method also defines operations of Pcell and Scells, which transmit HARQ-ACK/NACK and UCI as feedback of DL data, to follow operations of the UE and the BS according to a Pcell and Scells, according to the setting of each BS. In the aspect of transmitting a PUCCH in UL under the relevant CA, the method enables UCI to be transmitted by using a method for transmitting a PUCCH defined for each BS type on only a Pcell. Also, the method enables the use of a method which, as rules as to which relevant CCs (i.e., a Pcell or an Scell) are used to transmit UCI when the UCI piggybacks on a PUSCH, allows the UCI to be transmitted through a PUSCH of a Pcell when the Pcell includes the PUSCH, and the use of a method which allows the UCI to be transmitted through a PUSCH of an Scell having the lowest index among Scells when the Pcell does not include a PUSCH but the relevant Scells include the PUSCH. Alternatively, use may be made of a method which, when an aperiodic CSI request is designated by the BS, sets UCI to be transmitted through a PUSCH of a Pcell or an Scell of the relevant BS which is indicated by a UL grant indicating the relevant aperiodic CSI request.

Also, in the method, when a macrocell and a small cell (or a macro BS and a small cell BS) perform a joint operation and CA in an identical duplex mode or different duplex modes, in an aspect of the transmission of a PUSCH, the transmission of a PDSCH, and the transmission of a PUSCH under the CA, the PDSCH and the PUSCH may be set to be capable of being transmitted according to an operating method of the UE and an operating method of the BS under controlling a Pcell defined in each BS.

Finally, the method may be provided for minimizing the effect, such as compatibility between legacy systems, when a first case where an operation of the UE and a setting by the BS support a FDD-duplex-mode-only under CA in a single BS is compared with a second case where the operation of the UE and the setting by the BS support a TDD-duplex-mode-only under CA, when the operation of the UE and the setting by the BS are performed by using a method used in a single BS during CA in each of the FDD and TDD duplex modes or the TDD duplex mode in defining operations of the UE and the BS in each of a macro BS and a small cell BS by identically using the concept of the first embodiment 1. Specifically, since there exists an operation as a Pcell according to each of the macro BS and the small cell BS, an operation of the UE and an operation of the BS may be performed independently between BSs, according to operations of a Pcell and an Scell defined for each BS type. Accordingly, when a Pcell is defined/designated/set according to the relevant setting, the method enables a dual connectivity, a joint operation, or CA to be performed in the macro BS and the small cell BS while minimizing the effect such as compatibility between legacy systems.

However, in the case of the relevant method, when an access procedure (e.g., a cell search procedure, a random access procedure, a handover procedure, etc.) is performed, a scheme may be provided for allowing the macro BS to be first set as a BS, which first performs access, and allowing the access procedure to be performed according to the setting of the relevant Pcell. In this case, the scheme allows the access procedure to follow the relevant Pcell according to whether a synchronization channel used in the macro BS is first detected or according to whether a synchronization channel used in the small cell BS is first detected, when a cell search is performed by the UE.

According to another embodiment, a method may be provided for setting a priority to be assigned to a particular macro BS and a particular small cell BS, for example, assigns a priority to a macro BS when an LTE network is conventionally deployed by using the relevant macro BS and sufficient coverage and mobility support are provided and for allowing the access procedure to be performed. Alternatively, another method may be provided for assigning a priority to the small cell BS and allowing the access procedure to be performed when sufficient coverage and mobility support are provided by the relevant small cell BS differently from the above-described case. This method can solve an ambiguity problem between the UE and the BS which may occur in the access procedure according to the setting of a Pcell between different BS types.

The embodiment A is a method which enables the UE to perform a non-CA operation and a CA operation in the macro BS and a non-CA operation and a CA operation in the small cell BS when the UE accesses a network capable of supporting a dual connectivity although the UE does not support CA and a joint operation of the macro BS and the small cell BS, and the relevant dual connectivity therebetween, Although the embodiment B supports CA of a macro BS and a small cell BS and a dual connectivity therebetween similarly to the second embodiment 2, the embodiment B is a method for setting the use of a scheme for, with respect to the setting of a Pcell and an Scell, configuring one Pcell as in an existing scheme for performing a setting by one BS, and configuring the remaining CCs as Scells. An embodiment in the relevant case is as follows.

When one carrier supporting a macro BS is set as a Pcell and the remaining carriers (i.e., carriers except for the carrier which is set as the Pcell) of the macro BS and a small cell BS are configured as an Scell, configurations of X-1, X-2, X-3, X-4, and X-5 will be described below.

configuration X-1 {Pcell(macro), Scell-0(small cell)}
configuration X-2 {Pcell(macro), Scell-0(small cell), Scell-1(macro or small cell)}
configuration X-3 {Pcell(macro), Scell-0(small cell), Scell-1(small cell), Scell-2(macro or small cell)}
configuration X-4 {Pcell(macro), Scell-0(small cell), Scell-1(macro), Scell-2(macro or small cell)}
configuration X-5 {Pcell(macro), Scell-0(small cell), Scell-1(macro), Scell-2(macro or small cell), Scell-3(macro or small cell)}

When one carrier supporting a small cell BS is set as a Pcell and the remaining carriers (i.e., carriers except for the carrier which is set as the Pcell) of a macro BS and the small cell BS are configured as an Scell, configurations of Y-1, Y-2, Y-3, Y-4, and Y-5 will be described below.

configuration Y-1 {Pcell(Small cell), Scell-0(macro)}
configuration Y-2 {Pcell(Small cell), Scell-0(macro), Scell-1(Small cell or macro)}
configuration Y-3 {Pcell(Small cell), Scell-0(small cell), Scell-1(macro), Scell-2(Small cell or macro)} configuration Y-4 {Pcell(Small cell), Scell-0(macro), Scell-1(Small cell), Scell-2(Small cell or macro)} configuration Y-5 {Pcell(Small cell), Scell-0(macro), Scell-1(Small cell), Scell-2(Small cell or macro), Scell-3 (Small cell or macro)}

When the relevant method is used and a CC of the small cell BS or the macro BS is added, it may be necessary to explicitly add a parameter for indicating a BS type in such a manner as to discriminate between types of a macrocell and a small cell. Alternatively, the relevant method enables recognition of which carrier is an Scell supporting each BS type, according to an implicitly-indicated DL carrier frequency.

An embodiment C is a method for defining a Pcell in such a manner as to assign a priority to a carrier of a macro BS.

The relevant method sets a Pcell in such a manner as to assign a priority to a CC of a macro BS when supporting CA and a joint operation of the macro BS and a small cell BS, and a dual connectivity therebetween. When a Pcell is set in such a manner as to assign a priority to a small cell, a CC of the relevant small cell BS may have less sufficient robust mobility than that of the previously-deployed macrocell BS. A problem may occur in the transmission/reception of data in UL/DL by the UE, such as a case where, in a particular area, a coverage hole and the like are found and a Radio Link Failure (RLF) occurs, and the like. Accordingly, a method may be provided for selecting a Pcell in such a manner as to assign a priority to a CC of the macro BS, and thereby can prevent the relevant problem.

Hereinafter, with reference to the embodiment A, the embodiment B, and the embodiment C, in a method for setting a Pcell, a description will be made of a method and an apparatus for designating a Pcell/Scell according to different duplex modes which may be applied regardless of a duplex mode when CA, a joint operation, and a dual connectivity are performed in an environment of different macrocell and small cell (or macro eNB and small cell eNB).

Figure 19:
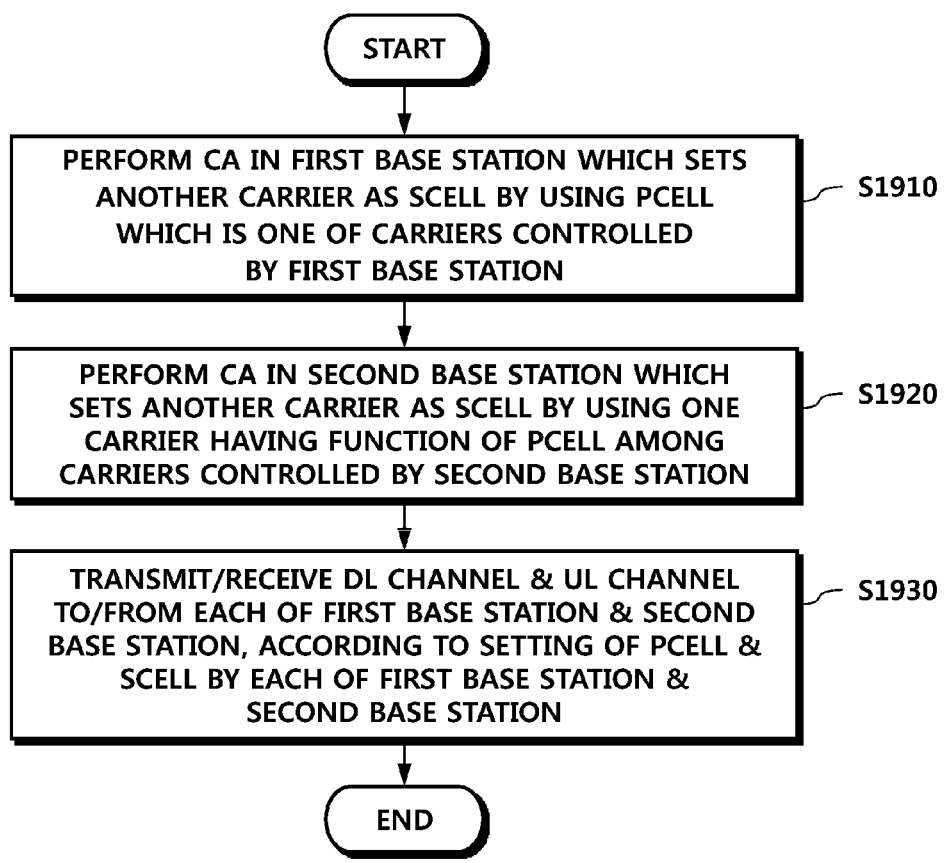
FIG. 19 is a view illustrating a process for controlling carrier aggregation in a small cell environment by a user equipment according to an Embodiment A of the present disclosure.

FIG. 19 is a view illustrating a process for controlling CA in a small cell environment by a UE according to the embodiment A of the present disclosure.

In step S1910, the UE performs CA in a first BS which sets another carrier as an Scell by using a Pcell which is one of carriers controlled by the first BS. In step S1920, the UE performs CA in a second BS which sets another carrier as an Scell by using one carrier having a function of a Pcell among carriers controlled by the second BS. In step S1930, the UE transmits/receives a DL channel and a UL channel to/from each of the first BS and the second BS, according to the setting of the Pcell and the Scell by each of the first BS and the second BS. Here, the first BS may be a macrocell and the second BS may be a small cell, or the first BS may be a small cell and the second BS may be a macrocell.

An example of one carrier having the function of the Pcell includes the above-described case where a Pcell is designated for each eNB.

Here, with respect to the function of the Pcell, step S1930 includes transmitting of a PUCCH on the carrier having the function of the Pcell.

Also, as described above, the UE may access the first BS in such a manner as to prioritize the first BS over the second BS, and the UE may set a Pcell.

Figure 20:
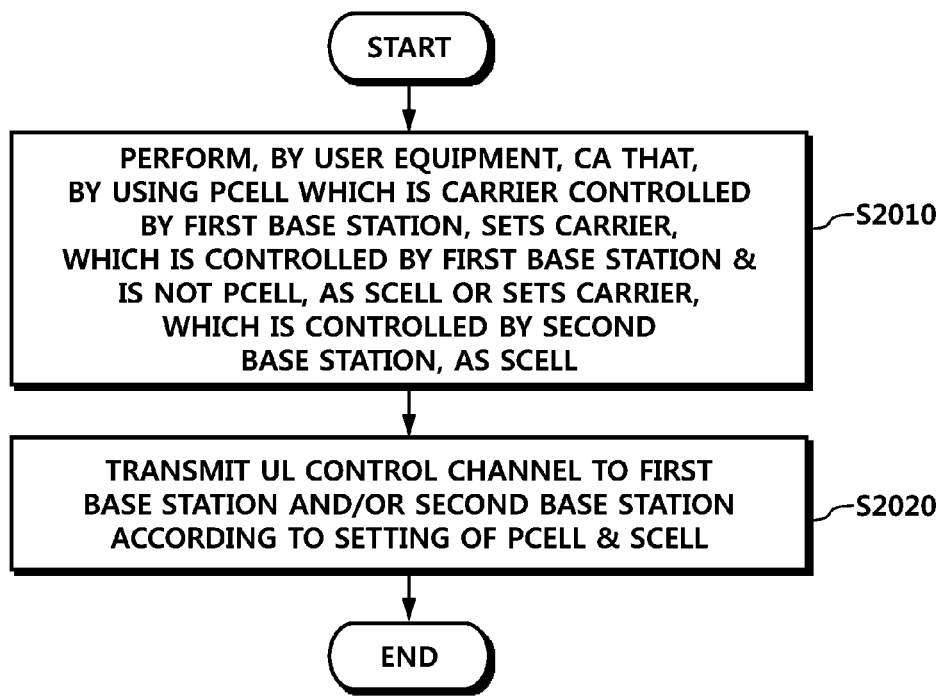
FIG. 20 is a view illustrating an operation of a user equipment according to Embodiment B and Embodiment C of the present disclosure.

FIG. 20 is a view illustrating an operation of a UE according to the embodiment B and the embodiment C of the present disclosure.

The operation of the UE according to the embodiments B and C will be described for a case where a Pcell is set for one BS and an Scell is set for BSs other than the one BS. In step S2010, the UE performs CA that, by using a Pcell which is a carrier controlled by a first BS, sets a carrier, which is controlled by the first BS and is not the Pcell, as an Scell or sets a carrier, which is controlled by a second BS, as the Scell. Then, in step S2020, the UE transmits a UL control channel to the first BS and/or the second BS according to the setting of the Pcell and the Scell.

In order to implement the embodiment B, in performing the CA in step S2010, the UE receives information on the first BS or the second BS which controls the carrier to be set as the Scell. The reception of the information includes receiving BS type information of an Scell.

In order to implement the embodiment C, the UE allows the first BS to be a macrocell BS. Specifically, the UE operates so as to always and first set the macrocell BS as a Pcell.

Figure 21:
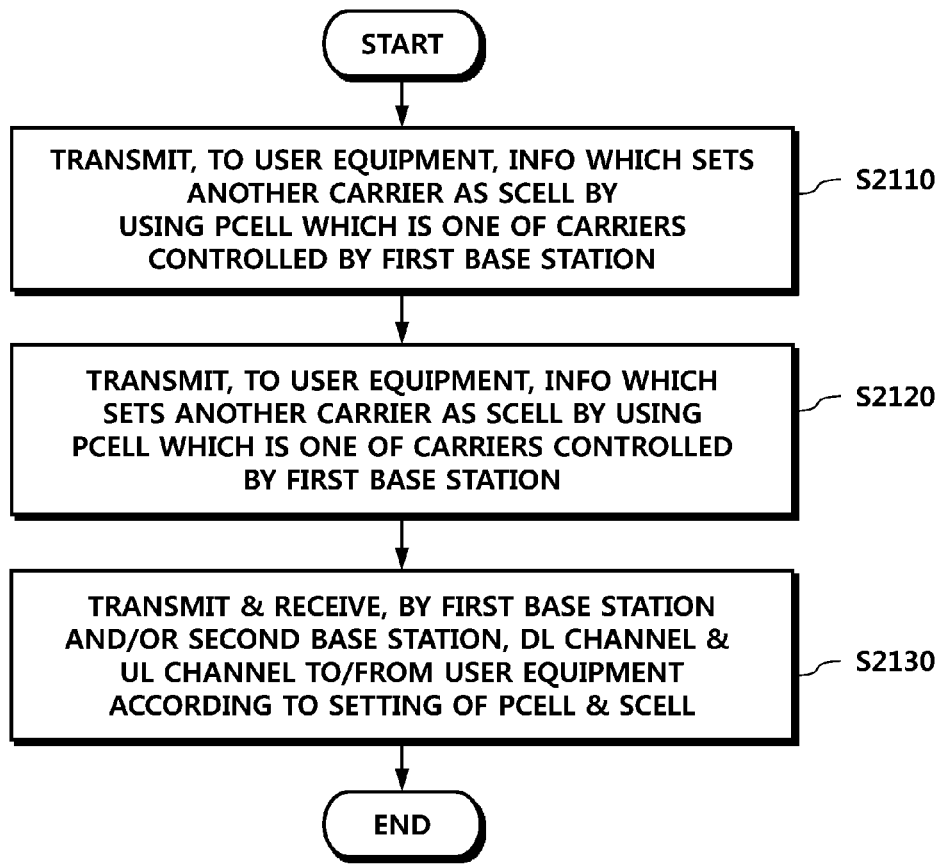
FIG. 21 is a view illustrating an operation of a base station according to the Embodiment A of the present disclosure.

FIG. 21 is a view illustrating an operation of a BS according to the embodiment A of the present disclosure. Referring to FIG. 21, the description will focus on an operation of the first BS. In controlling CA by the first BS in a small cell environment, in step S2110, the first BS transmits, to the UE, information which sets another carrier as an Scell by using a Pcell which is one of carriers controlled by the first BS. Then, the UE and the first BS performs CA together. In step S2120, the first BS transmits, to the UE, information which sets, as an Scell having a function of a Pcell, one of carriers controlled by the second BS distinguished from the first BS. Then, the UE and the second BS performs CA together. In step S2130, the first BS transmits and receives a DL channel and a UL channel to/from the UE according to the setting of the Pcell and the Scell. Similarly, the second BS also transmits and receives a DL channel and a UL channel to/from the UE according to the setting of a Pcell and an Scell. Here, the first BS may be a macrocell and the second BS may be a small cell, or the first BS may be a small cell and the second BS may be a macrocell.

The one carrier having the function of the Pcell includes the above-described case where a Pcell is designated for each eNB.

Here, the Scell having the function of the Pcell of the second BS becomes a carrier, on which the second BS transmits/receives a PUCCH to/from the UE. Then, the UE performs CA, in which the UE accesses the first BS in such a manner as to prioritize the first BS over the second BS, the UE and the first BS first set a Pcell together, and then the UE sets an Scell performing the function of the Pcell of the second BS.

Figure 22:
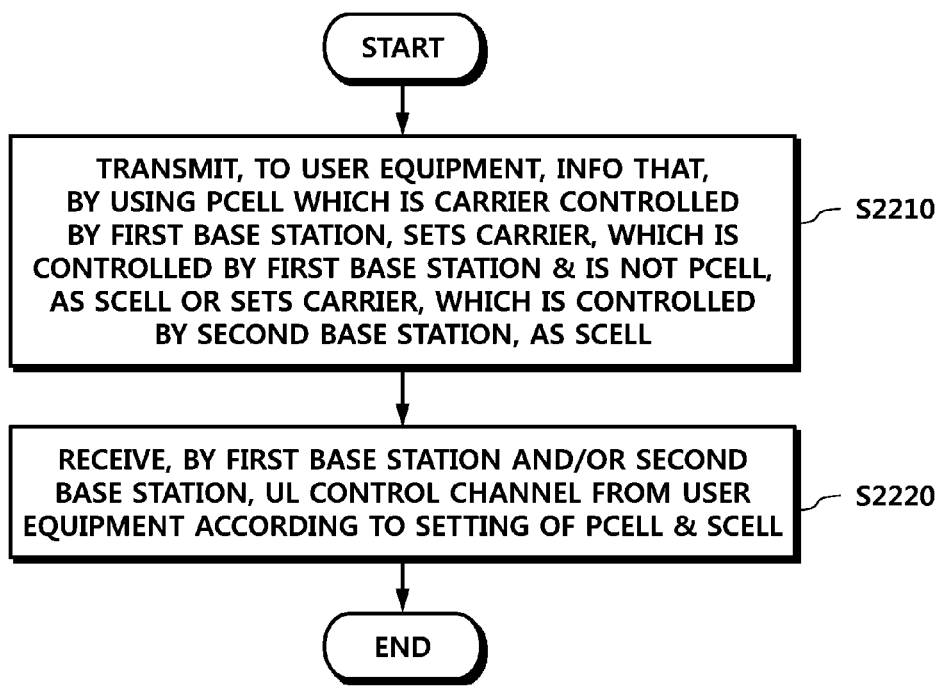
FIG. 22 is a view illustrating an operation of a base station according to the Embodiment B and the Embodiment C of the present disclosure.

FIG. 22 is a view illustrating an operation of a BS according to the embodiments B and C of the present disclosure. Referring to FIG. 22, the description will focus on an operation of the first BS.

In the first BS which controls CA in a small cell environment, in step S2210, the first BS transmits, to the UE, information that, by using a Pcell which is a carrier controlled by the first BS, sets a carrier, which is controlled by the first BS and is not the Pcell, as an Scell or sets a carrier, which is controlled by the second BS, as the Scell. In step S2220, the first BS receives a UL control channel from the UE according to the setting of the Pcell and the Scell.

More specifically, in the embodiment B, step S2210 includes additionally transmitting information on the first BS or the second BS which controls the carrier to be set as the Scell. Alternatively, in order to implement the embodiment C, the first BS may be a macrocell BS.

Figure 23:
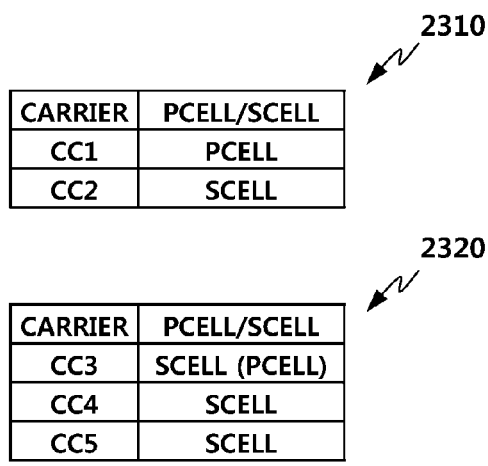
FIG. 23 is a view illustrating a function of a carrier according to Embodiment A of the present disclosure.

FIG. 23 is a view illustrating a function of a carrier according to the embodiment A of the present disclosure.

The embodiment A defines a Pcell depending on a BS. As indicated by reference numeral 2310, there are CC1 and CC2 which are carriers controlled by the first BS, and CC1 from thereamong is a Pcell. Meanwhile, as indicated by reference numeral 2320, there are CC3, CC4, and CC5 which are carriers controlled by the second BS, and CC3 from thereamong is a Pcell, that is, an Scell which performs a function of a Pcell in the second BS. The first BS may be a macro BS, and the second BS may be a small cell BS. In contrast, the first BS may be a small cell BS, and the second BS may be a macro BS.

According to the setting indicated by reference numerals 2310 and 2320, the UE may use CC1 to transmit a PUCCH to the first BS, and the UE may use CC3 to transmit a PUCCH to the second BS.

Figure 24:
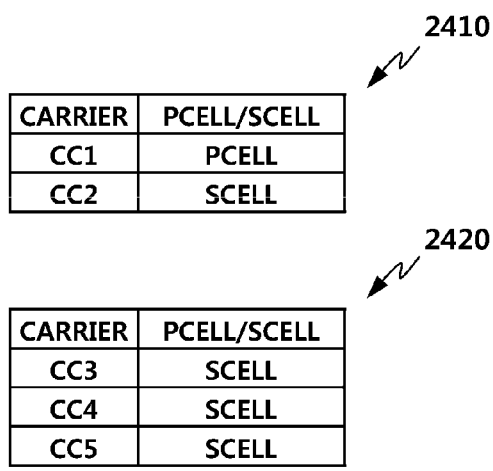
FIG. 24 is a view illustrating a function of a carrier according to Embodiment B or Embodiment C of the present disclosure.

FIG. 24 is a view illustrating a function of a carrier according to the embodiment B or the embodiment C of the present disclosure. In the embodiment B, one BS takes charge of a Pcell, and the other carriers are configured as an Scell.

As indicated by reference numeral 2410, there are CC1 and CC2 which are carriers controlled by the first BS, and CC1 from thereamong is a Pcell. Meanwhile, as indicated by reference numeral 2420, there are CC3, CC4, and CC5 which are carriers controlled by the second BS, and all of CC3, CC4, and CC5 are Scells. The first BS may be a macro BS, and the second BS may be a small cell BS. In contrast, the first BS may be a small cell BS, and the second BS may be a macro BS.

According to the embodiment B, the UE may set carriers, which are not a Pcell, as an Scell by using the Pcell of any one BS that the UE first accesses or by using the Pcell of any one BS according to a previously-set scheme.

According to the embodiment C, the UE may set a Pcell in such a manner as to assign a priority to a macro BS, and the UE may set the other carriers as an Scell. In the case of the embodiment C, reference numeral 2410 indicates a carrier configuration of a macro BS.

When CA is performed by using carriers having different TDD and FDD duplex modes, and when CA is performed by using carriers supported by different BS types, an ambiguity problem is solved between the UE and the BS regarding an operation of the UE (e.g., a DL/UL control channel, a DL/UL data channel, an access procedure, etc. between the BS and the UE), which operates according to the setting of a Pcell and an Scell between the UE and the BS, and a setting by the BS. Accordingly, accuracy is achieved for an access procedure, UL/DL data transmission, and an operation of transmission/reception of a UL/DL control channel including an HARQ operation, which are performed between the UE and the BS, and thereby the reliability of data transmission between the UE and the BS can be ensured. As a result, a data transmission rate in UL/DL can be increased.

Also, when CA between BSs having different BS types (i.e., inter-BS CA) and the support of a dual connectivity therebetween are performed, an ambiguity problem is solved between the UE and the BS regarding an operation of the UE, which operates according to the setting of a Pcell and an Scell between the UE and the different BS types, and a setting by the BS. Accordingly, accuracy is achieved for an access procedure, UL/DL data transmission, and an operation of transmission/reception of a UL/DL control channel including an HARQ operation, which are performed between the UE and the BS, and thereby the reliability of the transmission of data by the UE in the case of the UE and the different BSs can be ensured. As a result, a data transmission rate in UL/DL can be increased.

Figure 25:
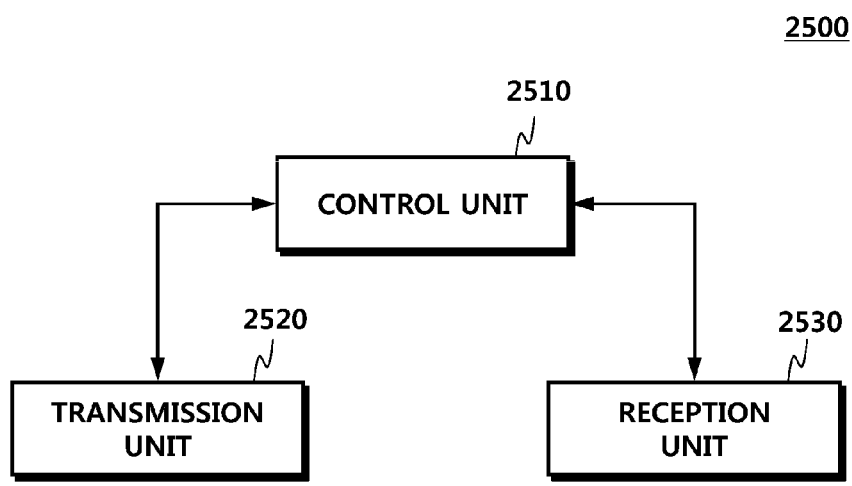
FIG. 25 is a view illustrating a configuration of a user equipment according to another embodiment of the present disclosure.

FIG. 25 is a view illustrating a configuration of a UE according to an embodiment of the present disclosure.

Referring to FIG. 25, the UE 2500 includes a reception unit 2530, a control unit 2510, and a transmission unit 2520. FIG. 25 illustrates the UE 2500 which controls CA in a small cell environment.

The reception unit 2530 receives DL control information, DL data, and a message through a relevant channel from the BS.

Also, in a method for setting a Pcell by the UE required to perform the above-described embodiments of the present disclosure, the control unit 2510 controls an overall operation of the UE according to the setting of a Pcell which considers a joint operation and CA of FDD and TDD in different duplex modes.

The control unit 2510 controls an overall operation of the UE for designating a Pcell/Scell according to different BS types, which may be applied regardless of a duplex mode when CA, a joint operation, and a dual connectivity are performed in an environment of different macrocell and small cell (or macro eNB and small cell eNB) required to perform the above-described present.

The transmission unit 2520 transmits UCI, UL data, and a message through a relevant channel to the BS.

More specifically, the description will focus on the embodiment A.

The control unit 2510 performs CA in the first BS which sets another carrier as an Scell by using a Pcell which is one of carriers controlled by the first BS. The control unit 2510 performs CA in the second BS which sets another carrier as an Scell by using one carrier having a function of a Pcell among carriers controlled by the second BS. As a result, the control unit 2510 may set a Pcell for the first BS. The control unit 2510 may also set a Pcell or an Scell, which performs a function of the Pcell, for the second BS. Then, the reception unit 2530 receives a DL channel from each of the first BS and the second BS according to the setting of the Pcell and the Scell by each of the first BS and the second BS. The transmission unit 2520 transmits a UL channel to each of the first BS and the second BS according to the setting of the Pcell and the Scell by each of the first BS and the second BS. The description made in the embodiment A is applied to the transmission of a UL channel. The transmission unit 2520 may transmit a PUCCH on the carrier having the function of the Pcell. Also, the control unit 2510 may control such that the UE accesses the first BS in such a manner as to prioritize the first BS over the second BS and sets a Pcell.

The description will focus on the embodiment B and the embodiment C as follows. The control unit 2510 performs CA that, by using a Pcell which is a carrier controlled by the first BS, sets a carrier, which is controlled by the first BS and is not the Pcell, as an Scell or sets a carrier, which is controlled by the second BS, as the Scell. This configuration implies that a Pcell is set for only the first BS which is one BS and all of the other carriers are set as an Scell. Then, the transmission unit 2520 transmits a UL control channel to the first BS and/or the second BS according to the setting of the Pcell and the Scell. The reception unit 2530 receives a DL channel from the first BS and/or the second BS according to the setting of the Pcell and the Scell.

As in the embodiment B, the reception unit 2530 may receive information on the first BS or the second BS which controls the carrier to be set as the Scell. Alternatively, as in the embodiment C, the first BS may be set as a macrocell BS, and the UE may first access the macrocell BS and may set a Pcell.

Figure 26:
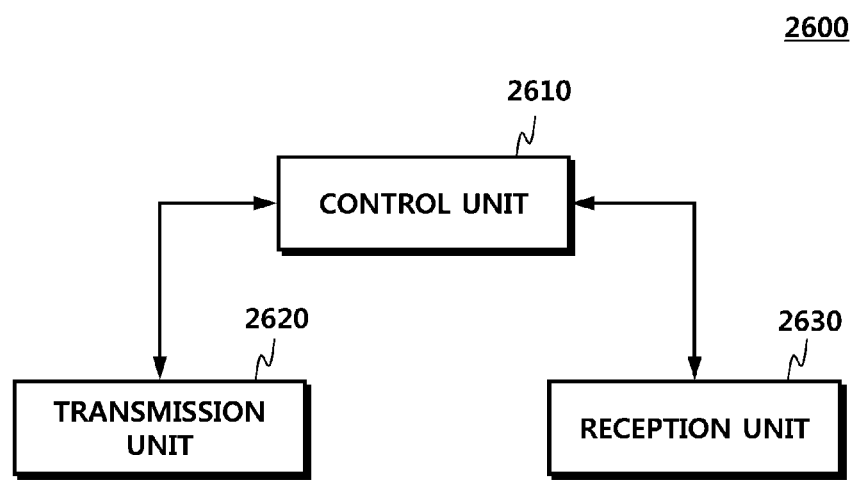
FIG. 26 is a view illustrating a configuration of a base station according to another embodiment of the present disclosure.

FIG. 26 is a view illustrating a configuration of a BS according to an embodiment of the present disclosure.

Referring to FIG. 26, the BS 2600 includes a control unit 2610, a transmission unit 2620, and a reception unit 2630. FIG. 26 illustrates the BS 2600 which controls CA in a small cell environment.

The control unit 2610 controls an overall operation of the BS according to the setting of a Pcell which considers a joint operation and CA of FDD and TDD in different duplex modes required to perform the above-described present.

Also, in a method for setting a Pcell by the UE required to perform the above-described embodiments of the present disclosure, the control unit 2610 controls an overall operation of the BS for designating a Pcell/Scell according to different duplex modes, which may be applied regardless of a duplex mode when CA, a joint operation, and a dual connectivity are performed in an environment of different macrocell and small cell (or macro eNB and small cell eNB).

The transmission unit 2520 and the reception unit 2630 are used to transmit and receive signals, messages, and data, which are required to perform the above-described present, to/from the UE. More specifically, the description will focus on the embodiment A as follows. The reception unit 2630 receives a UL channel from the UE. Then, the transmission unit 2620 transmits, to the UE, information which sets another carrier as an Scell by using a Pcell which is one of carriers controlled by the BS, and transmits, to the UE, information which sets, as an Scell having a function of a Pcell, one of carriers controlled by the second BS distinguished from the BS. Then, the control unit 2610 provides a function of controlling such that the transmission unit 2620 and the reception unit 2630 transmit and receive a DL channel and a UL channel to/from the UE according to the setting of the Pcell and the Scell.

Meanwhile, the Scell having the function of the Pcell may become a carrier, on which the second BS transmits/receives a PUCCH to/from the UE. Also, it may be set or previously agreed that the UE accesses the first BS in such a manner as to prioritize the first BS over the second BS.

Next, the description will focus on the embodiments B and C.

The control unit 2610 generates information that, by using a Pcell which is a carrier controlled by the BS, sets a carrier, which is controlled by the first BS and is not the Pcell, as an Scell or sets a carrier, which is controlled by the second BS, as the Scell. Then, the transmission unit 2620 transmits the generated information to the UE, and indicates that the UE may perform CA. Next, the reception unit 2630 receives a UL control channel from the UE according to the setting of the Pcell and the Scell.

In the embodiment B, the control unit 2610 may generate information on the first BS and the second BS which controls the carrier to be set as the Scell, and the transmission unit 2620 may transmit the generated information to the UE. In the embodiment C, the first BS may be a macrocell BS.

The above description is only an illustrative description of the technical idea of the present disclosure, and those having ordinary knowledge in the technical field, to which the present disclosure pertains, will appreciate that various modifications and changes in form are possible without departing from the essential features of the present disclosure. Therefore, the embodiments disclosed in the present disclosure are intended not to limit but to describe the technical idea of the present disclosure, and thus do not limit the scope of the technical idea of the present disclosure. The protection scope of the present disclosure should be construed based on the appended claims, and all of the technical ideas included within the scope equivalent to the appended claims should be construed as being included within the right scope of the present disclosure.

The invention claimed is:

1. A method for performing carrier aggregation by a user equipment, the method comprising:
   performing, by the user equipment (UE), a first carrier aggregation in a first base station, wherein the first carrier aggregation sets a first secondary cell by using a first primary cell, the first primary cell is set with one of carriers controlled by the first base station, and the first secondary cell is set with other carriers controlled by the first base station;
   performing, by the user equipment, a second carrier aggregation in a second base station, wherein the second carrier aggregation sets a second secondary cell by using one carrier having a function of a second primary cell among carriers controlled by the second base station, and the second secondary cell is set with other carriers controlled by the second base station; and
   transmitting/receiving, by the user equipment, a downlink channel and an uplink channel to/from each of the first base station and the second base station according to the setting of the primary cell and the secondary cell in each of the first base station and the second base station,
   wherein the first carrier aggregation associated with the first base station and the second carrier aggregation associated with the second base station are performed independently from each other.

2. The method as claimed in claim 1, wherein the transmitting/receiving of the downlink channel and the uplink channel comprises transmitting/receiving a Physical Uplink Control CHannel (PUCCH) on the one carrier having the function of the second primary cell.

3. The method as claimed in claim 1, wherein the UE is configured to access the first base station in such a manner as to prioritize the first base station over the second base station and set the first primary cell for the first carrier aggregation.

4. A method for setting carrier aggregation in different duplex modes by a user equipment, the method comprising:
   setting execution of a first carrier aggregation in a first duplex mode for adding a first secondary cell by using a first primary cell, wherein the first primary cell is set with one of first carriers of the first duplex mode of at least one base station that the user equipment accesses, and the first secondary cell is set by using other first carriers of the first duplex mode;
   setting execution of a second carrier aggregation in a second duplex mode for adding a second secondary cell by using one carrier having a function of a second primary cell among second carriers of the second duplex mode, wherein the second secondary cell is set by using other second carriers of the second duplex mode; and
   transmitting/receiving a downlink channel and an uplink channel in each of the first duplex mode and the second duplex mode, according to the setting of the primary cell and the secondary cell in each of the first duplex mode and the second duplex mode,
   wherein the first carrier aggregation associated with the first duplex mode and the second carrier aggregation associated with the second duplex mode are performed independently from each other.

5. The method as claimed in claim 4, wherein the transmitting/receiving of the downlink channel and the uplink channel comprises:

in a case that a Physical Uplink Control CHannel (PUCCH) is set to be transmitted on the carrier having the function of the second primary cell or uplink control information is set to piggyback on a Physical Uplink Shared CHannel (PUSCH), transmitting the uplink control information through the PUSCH on the carrier having the function of the second primary cell if the carrier having the function of the second primary cell includes the PUSCH; and controlling the uplink control information to piggyback on the PUSCH of a secondary cell having a lowest index, wherein the PUSCH is scheduled among secondary cells of the first duplex mode or the second duplex mode, if the carrier having the function of the second primary cell does not include the PUSCH.

6. The method as claimed in claim 4, further comprising:

setting, by the user equipment and the at least one base station, the first primary cell by using the one carrier of the first duplex mode determined as a duplex mode which is used for transmission of a synchronization channel detected first between a synchronization channel used for the carrier of the first duplex mode and a synchronization channel used for the carrier of the second duplex mode; and performing an access procedure at the first primary cell.

7. The method as claimed in claim 6, wherein the first duplex mode performing the access procedure is set to have a priority.

\* \* \* \* \*

UNITED STATES PATENT AND TRADEMARK OFFICE
CERTIFICATE OF CORRECTION

PATENT NO. : 9,832,693 B2  
APPLICATION NO. : 14/897230  
DATED : November 28, 2017  
INVENTOR(S) : Noh et al.

Page 1 of 1

It is certified that error appears in the above-identified patent and that said Letters Patent is hereby corrected as shown below:

In the Claims  
In Claim 1, at Column 36, Line 16, delete "other" and insert therefor -- another --.  
In Claim 1, at Column 36, Line 16, delete "carriers" and insert therefor -- carrier --.  
In Claim 1, at Column 36, Line 24, delete "other" and insert therefor -- another --.  
In Claim 1, at Column 36, Line 24, delete "carriers" and insert therefor -- carrier --.  
In Claim 1, at Column 36, Line 25, delete "a downlink channel and an uplink channel" and insert therefor -- an uplink channel and a downlink channel --.  
In Claim 1, at Column 36, Line 28, after the words "of the", add "first".  
In Claim 1, at Column 36, Line 28, after the words "and the", add "first".  
In Claim 1, at Column 36, Line 29, delete "each of".  
In Claim 1, at Column 36, Line 29, after the word "and", add "the setting of the one carrier having a function of a second primary cell and the second secondary cell in".  
In Claim 2, at Column 36, Line 36, delete "the downlink channel and the uplink channel" and insert therefor -- the uplink channel and the downlink channel --.  
In Claim 2, at Column 36, Line 37, delete "transmitting/receiving" and insert therefor -- transmitting --.  
In Claim 4, at Column 36, Line 52, delete "other" and insert therefor -- another one of the --.  
In Claim 4, at Column 36, Line 59, delete "other" and insert therefor -- another one of the --.  
In Claim 4, at Column 36, Line 63, after the words "of the", add "first".  
In Claim 4, at Column 36, Line 64, after the words "and the", add "first".  
In Claim 4, at Column 36, Line 64, after the word "in", delete "each of".  
In Claim 4, at Column 36, Line 65, after the word "and", add "the setting of the one carrier having a function of a second primary cell and the second secondary cell in".  
In Claim 5, at Column 37, Line 4, delete "downlink channel and the uplink channel" and insert therefor -- uplink channel and the downlink channel --.

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*